US012346986B2

(12) United States Patent
Brovman et al.

(10) Patent No.: US 12,346,986 B2
(45) Date of Patent: Jul. 1, 2025

(54) PROVIDING DYNAMIC ALTERNATE LOCATION TRANSPORTATION MODES AND USER INTERFACES WITHIN MULTI-PICKUP-LOCATION AREA GEOFENCES

(71) Applicant: Lyft, Inc., San Francisco, CA (US)

(72) Inventors: Sarah Yael Brovman, New York, NY (US); Timothy Tay Chao, San Francisco, CA (US); Daniel Kyungwon Doo, Albany, CA (US); Nir Even Chen, Redwood City, CA (US); Eun Joung, San Francisco, CA (US); Ivan Nikolaev Konov, San Francisco, CA (US); Allen Lamson Nguyen, Long Island City, NY (US); Lily Sierra, San Francisco, CA (US); Petch Wannissorn, New York, NY (US)

(73) Assignee: Lyft, Inc., San Francisco, CA (US)

( * ) Notice: Subject to any disclaimer, the term of this patent is extended or adjusted under 35 U.S.C. 154(b) by 482 days.

(21) Appl. No.: 17/039,171

(22) Filed: Sep. 30, 2020

(65) Prior Publication Data

US 2022/0101473 A1 Mar. 31, 2022

(51) Int. Cl.
*G06Q 50/40* (2024.01)
*G06F 3/04842* (2022.01)
*G06Q 10/0631* (2023.01)
*G06Q 30/0204* (2023.01)
*G06Q 30/08* (2012.01)
(Continued)

(52) U.S. Cl.
CPC ......... *G06Q 50/40* (2024.01); *G06F 3/04842* (2013.01); *G06Q 10/06315* (2013.01); *G06Q 30/0205* (2013.01); *G06Q 30/08* (2013.01); *G06T 11/206* (2013.01); *H04W 4/021* (2013.01)

(58) Field of Classification Search
CPC .......................................... G06Q 10/00–90/00
See application file for complete search history.

(56) References Cited

U.S. PATENT DOCUMENTS

| | | | |
|---|---|---|---|
| 9,599,477 B1 * | 3/2017 | Aula ....................... E05F 15/76 |
| 9,939,279 B2 * | 4/2018 | Pan ..................... G01C 21/3438 |
| 9,958,272 B2 * | 5/2018 | Morris, IV ......... G01C 21/3415 |

(Continued)

*Primary Examiner* — Arif Ullah
(74) *Attorney, Agent, or Firm* — Keller Preece PLLC

(57) ABSTRACT

The present disclosure relates to systems, non-transitory computer readable media, and methods that intelligently provide dynamic transportation modes and corresponding user interfaces to client devices within multi-pickup-location area geofences to satisfy dynamic limitations corresponding to certain alternate location options. For instance, the disclosed systems can provide a transportation option corresponding to a first pickup location for display via the requestor device. Based on determining that the requestor device is associated with a location within a geofence of a multi-pickup-location area, the disclosed systems can provide a selectable mode option for initiating an alternate location transportation mode that includes modifying the pickup location for a transportation request to a second pickup location. Furthermore, the disclosed system can dynamically change access to and transportation values associated with alternate location transportation modes to satisfy dynamic limitations imposed across various pickup locations.

20 Claims, 15 Drawing Sheets

(51) Int. Cl.
　　　*G06T 11/20*　　　(2006.01)
　　　*H04W 4/021*　　　(2018.01)

(56) References Cited

U.S. PATENT DOCUMENTS

| | | | | |
|---|---|---|---|---|
| 10,126,138 | B1* | 11/2018 | Farmer | G06Q 50/40 |
| 2015/0161554 | A1* | 6/2015 | Sweeney | G06Q 50/40 |
| | | | | 705/7.15 |
| 2017/0052034 | A1* | 2/2017 | Magazinik | G06Q 10/047 |
| 2017/0098184 | A1* | 4/2017 | Marco | G08G 1/202 |
| 2019/0205812 | A1* | 7/2019 | Afzal | H04L 67/12 |

* cited by examiner

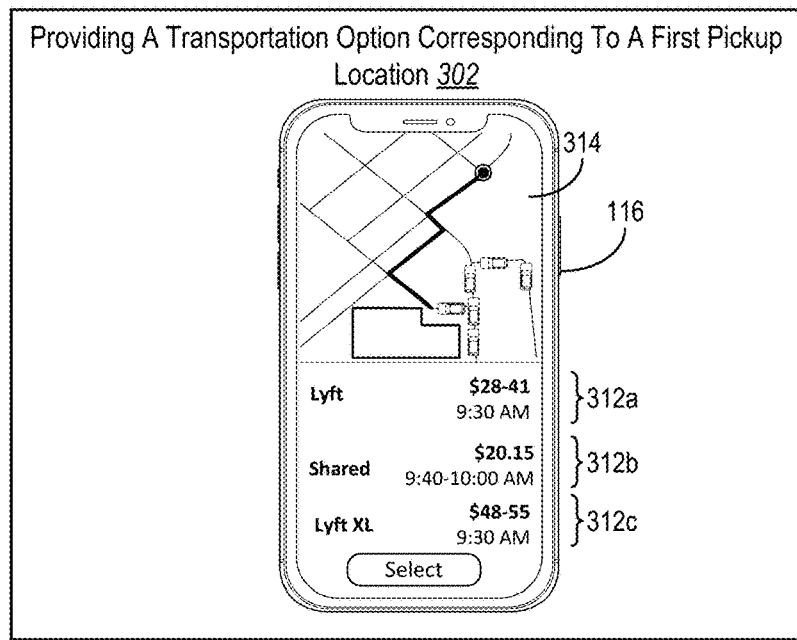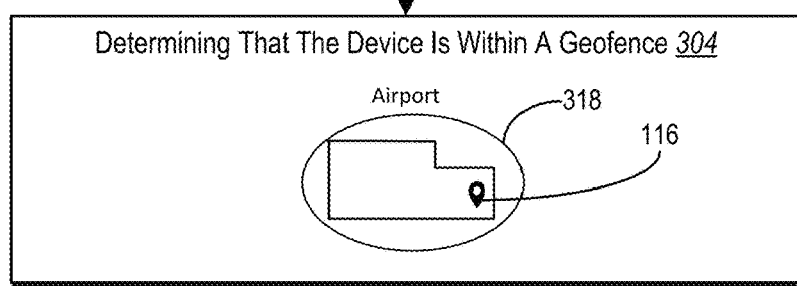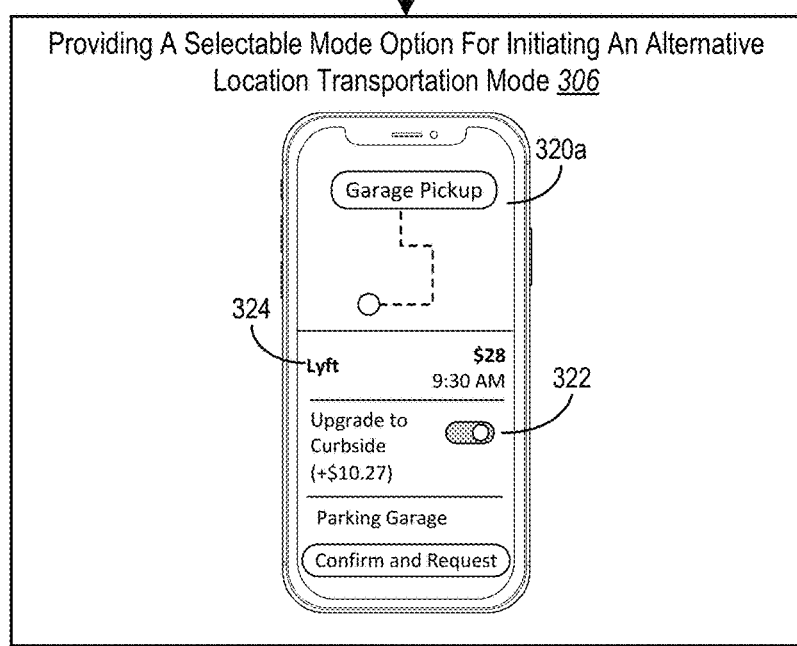
Fig. 3A

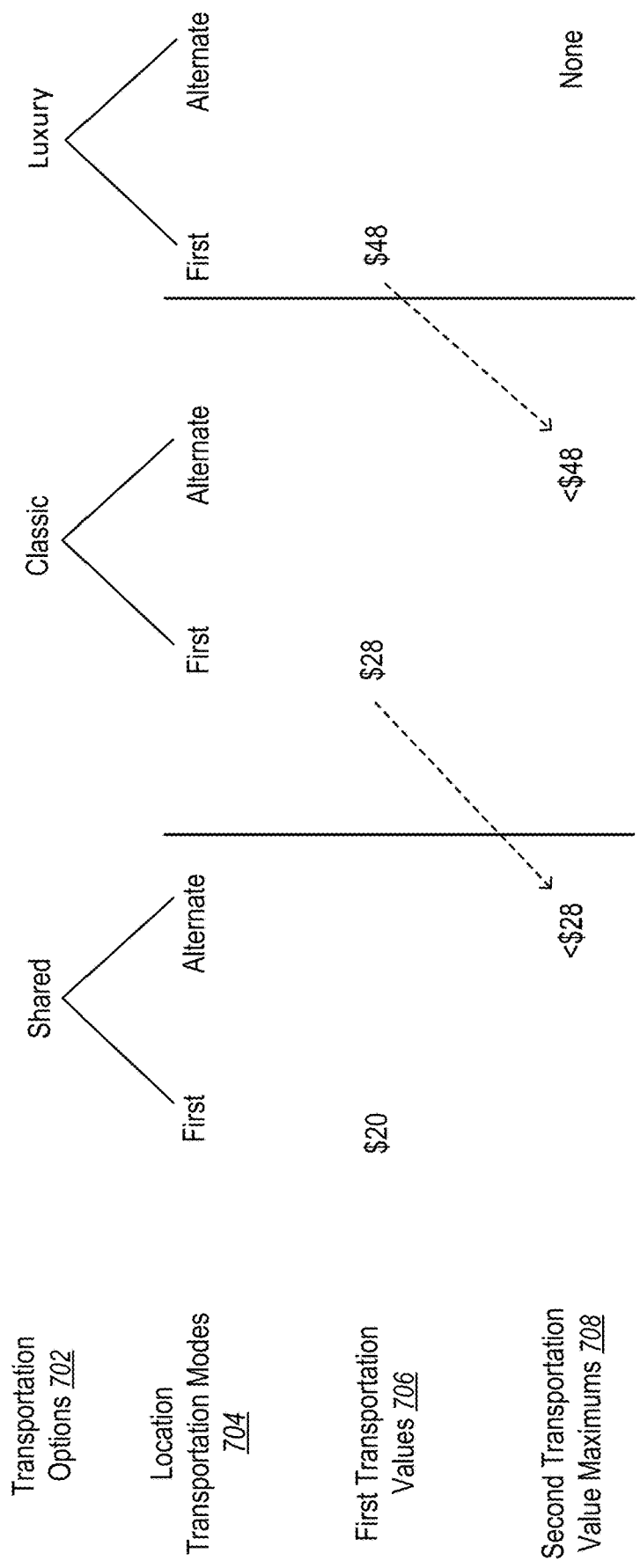

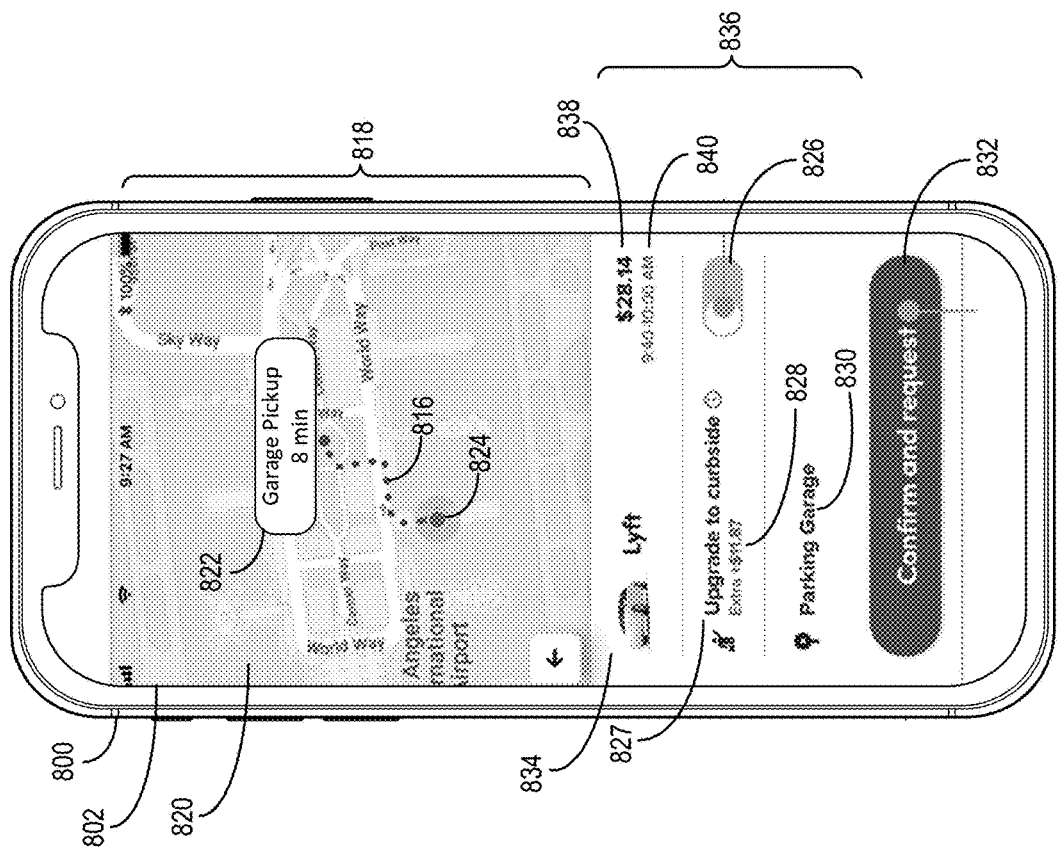
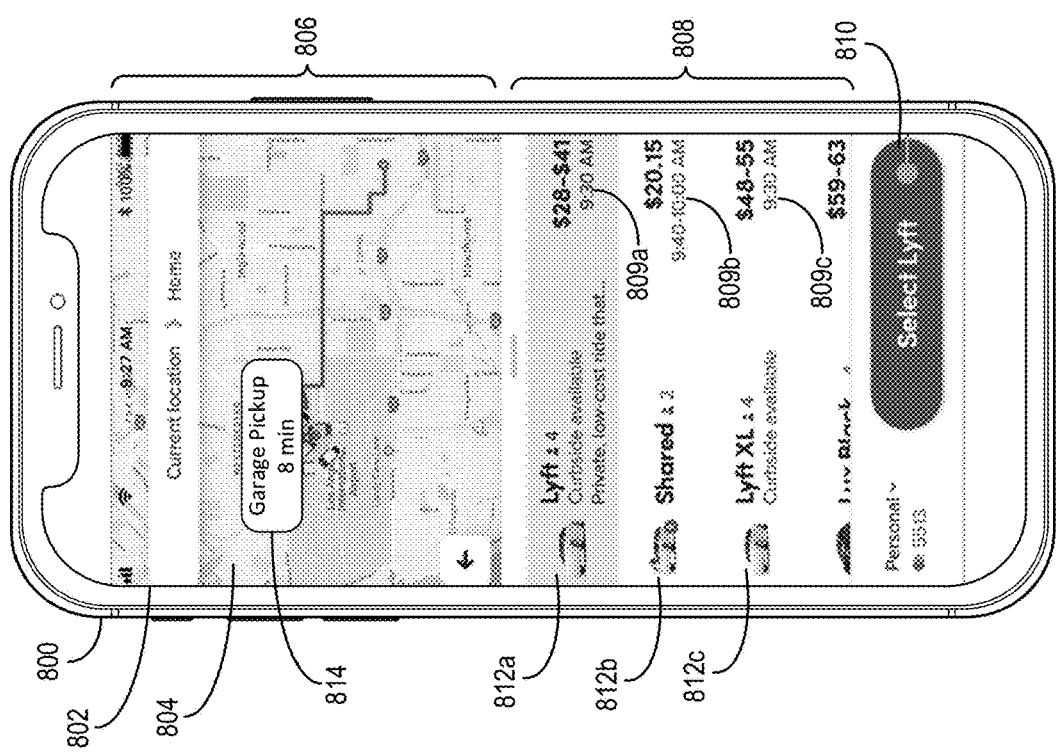
Fig. 8B
Fig. 8A

PROVIDING DYNAMIC ALTERNATE LOCATION TRANSPORTATION MODES AND USER INTERFACES WITHIN MULTI-PICKUP-LOCATION AREA GEOFENCES

BACKGROUND

In recent years, transportation matching systems have introduced significant technological improvements in mobile app-based matching of transportation providers and requestors. Indeed, the proliferation of web and mobile applications enable requesting computer devices to submit transportation requests via on-demand transportation matching systems. On-demand transportation matching systems can identify available provider computing devices that can provide transportation services from one geographic location to another and efficiently identify digital matches between provider computing devices and requestor computing devices. Although conventional transportation matching systems dispatch provider computing devices to requestor pickup locations, conventional systems often face a number of technical problems, particularly with respect to flexibility of operation and efficiency of implementing computing devices.

SUMMARY

One or more embodiments provide benefits and/or solve one or more problems in the art with systems, methods, and non-transitory computer readable storage media that provide dynamic transportation modes and corresponding client device graphical user interfaces within geofences corresponding to multi-pickup-location areas that impose limitations on alternate location options. In particular, hub locations such as airports or crowded venues often include a number of pickup points but impose dynamic limitations as to the number or frequency of requestor devices and/or provider devices that can utilize certain alternate pickup locations. The disclosed systems can monitor electronic signals from client devices and determine requestor devices within a geofence corresponding to a multi-pickup-location area. The disclosed systems can also analyze real-time transportation requests and the intersection between the transportation requests and dynamic limitations imposed at alternate pickup locations. Based on determining a client device falls within a geofence corresponding to the multi-pickup-location area and determining that existing transportation requests have not exceeded limitations corresponding to an alternate pickup location, the disclosed system can provide a selectable mode option within a client device graphical user interface for initiating a transportation request from the alternate pickup location. Moreover, based on user interaction, the disclosed system can initiate the transportation mode by modifying user interfaces and a transportation request to target the alternate pickup location, while still satisfying alternate pickup location limitations. In this manner, the disclosed system can generate efficient user interfaces within a particular geofence while also accurately and flexibly satisfying thresholds imposed at various pickup points.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

FIGS. 3A-3B illustrate a diagram of dispatching a provider device using an alternate location transportation mode in accordance with one or more embodiments of the present disclosure.

FIG. 7 illustrates a diagram of determining a second transportation value range in accordance with one or more embodiments of the present disclosure.

FIGS. 8A-8E illustrate a series of graphical user interfaces presenting multiple transportation options and alternate location transportation modes in accordance with one or more embodiments of the present disclosure.

DETAILED DESCRIPTION

Figure 1:
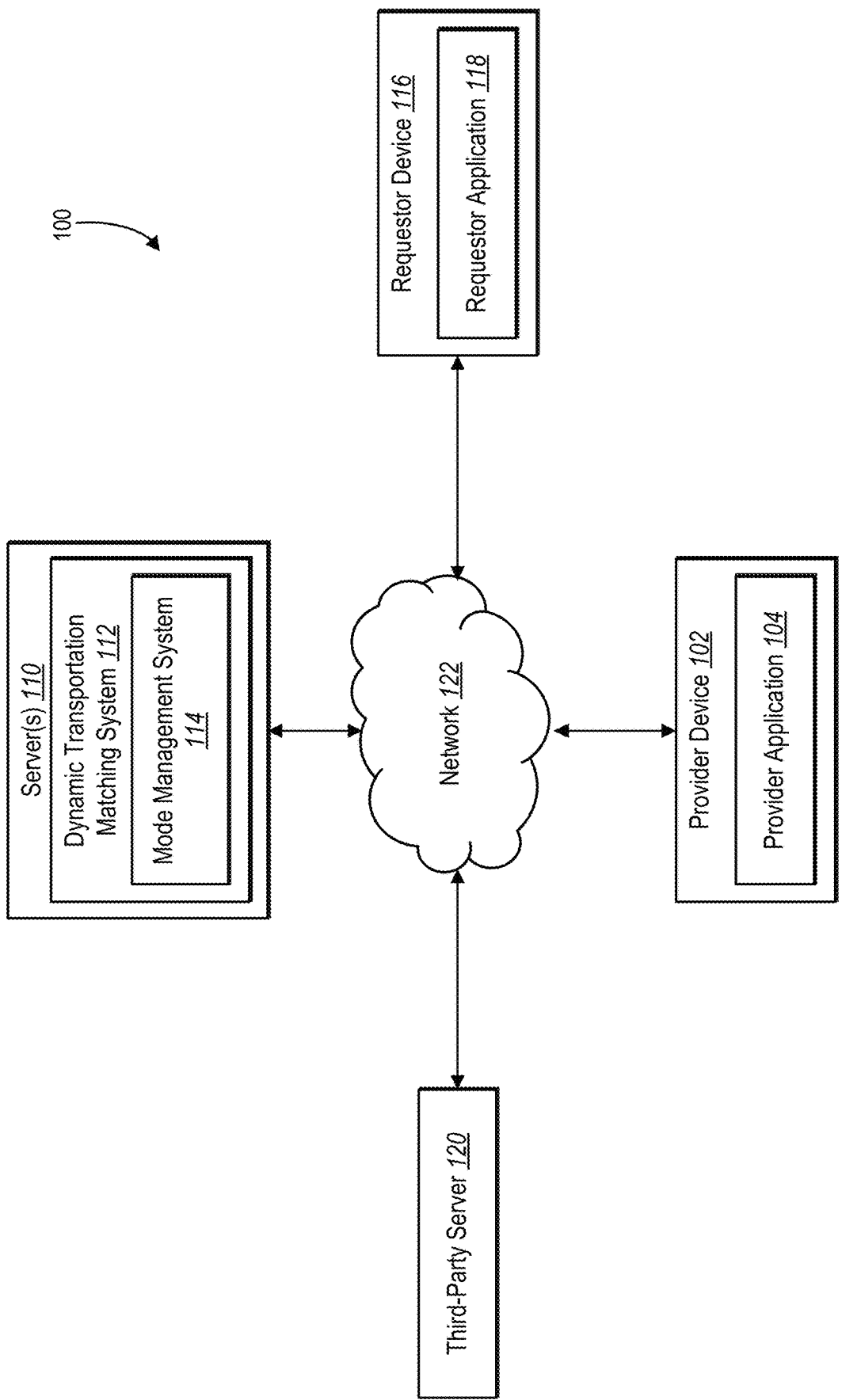
FIG. 1 illustrates an environment in which a mode management system can operate in accordance with one or more embodiments of the present disclosure.

One or more embodiments of the present disclosure include a mode management system that provides dynamic transportation modes and corresponding user interfaces to client devices within multi-pickup-location area geofences to satisfy dynamic limitations corresponding to certain alternate location options. For example, the mode management system can present within a client device graphical user interface one or more transportation options associated with a default pickup location within a multi-pickup-location area. The mode management system can determine whether to surface an alternate location transportation mode based on whether the requestor device is associated with a multi-pickup-location geofence and whether the alternate location transportation mode would satisfy limitations imposed at one or more alternate locations. For instance, the mode management system can determine to present an alternate location transportation mode associated with a second pickup location (i.e., closer to the location of the requestor device) than the default pickup location. Upon detecting requestor interaction with the selectable mode option, the mode management system can initiate the alternate location transportation mode by updating the graphical user interface to display information relevant to the second pickup location and creating a transportation request corresponding to the second pickup location while satisfying dynamic limitations on requestor devices and/or provider devices imposed at the second pickup location.

As mentioned, the mode management system can provide a transportation option corresponding to a first pickup location for display via a graphical user interface of a client device. In particular, in some embodiments, the mode management system presents details associated with a transportation option comprising a provider device picking up the client device (i.e., a requestor device) at a default pickup location (e.g., a pickup location without transportation limitations). For example, the graphical user interface can display a transportation value associated with the transportation option. Additionally, the mode management system can present, via the graphical user interface, additional transportation options associated with the first pickup location. For example, in some embodiments, the mode management system presents different transportation options comprising different provider vehicle or ride types.

In some embodiments, the mode management system determines whether the client device is associated with a location within a geofence corresponding to a multi-pickup-location area. Generally, a multi-pickup-location area includes various areas at which a provider device may meet and pick up a requestor device. For example, an airport (i.e., a multi-pickup-location area) may include a primary pickup location comprising a parking garage. Additionally, the same airport may include an alternate (and more convenient) pickup location comprising a curbside spot with limitations on a number or frequency of provider devices/requestor devices. Based on receiving a transportation request from a requestor device associated with a location within a multi-pickup-location area, the mode management system can provide a selectable mode option for initiating an alternate location transportation mode.

The mode management system may generate several transportation modes, each associated with a pickup location of a multi-pickup-location area. Generally, different pickup locations within a multi-pickup-location area may be associated with different limitations. For instance, physical limitations of multi-pickup-location areas often limit the number of provider devices that the mode management system can efficiently dispatch to a particular pickup location. To illustrate, a particular pickup location may have a limited number of lanes and/or a small area within which the requestor device can enter the provider vehicle. In addition, multiple transportation providers may dispatch provider devices and/or requestor devices to these locations. Accordingly, certain locations often have dynamic limitations imposed, such as a limit on the total number of provider devices that can utilize alternate pickup locations within a certain amount of time. To efficiently manage these limitations within a multi-pickup-location area, the mode management system may intelligently associate provider devices with different transportation modes.

The mode management system can provide a selectable mode option for providing alternate location transportation modes. Generally, the selectable mode option comprises a selectable user interface element associated with presenting additional transportation modes. More specifically, based on selection of the selectable mode option, the mode management system can present data relating to one or more alternate location transportation modes associated with different pickup locations. Based on user interaction with (e.g., selection of) selectable mode option, the mode management system can present a selected transportation option associated with an alternative or second pickup location.

As mentioned, the mode management system can intelligently determine whether to provide the selectable mode option for initiating an alternate location transportation mode. Generally, the mode management system may satisfy dynamic limits corresponding to alternate pickup locations by intelligently determining whether or not to provide the selectable mode option. For example, the mode management system may determine a threshold number of provider devices (or requestor devices) associated with the alternate pickup location (e.g., current or historical provider devices/requestor devices the curbside pickup location) and provide the selectable mode option based on the determined threshold.

Based on determining to provide the selectable mode option, the mode management system may provide the selectable mode option via an intuitive graphical user interface display. In particular, the mode management system can provide, within a graphical user interface, a first pickup location and a second pickup location. Furthermore, the mode management system may indicate, via the graphical user interface, a difference in transportation value between the original location transportation mode and the alternate location transportation mode. Thus, the mode management system efficiently presents data relating to various location transportation modes. In some embodiments, the mode management system can further dynamically modify user interface elements relating to different transportation modes (e.g., transportation value for the various transportation modes) to satisfy limitations imposed at alternate pickup locations.

Although conventional transportation matching systems can generate digital matches between requestor devices and provider devices and navigate these devices to designated meeting or pickup locations, conventional systems often face a number of technical problems, particularly with respect to flexibility, accuracy, and efficiency of operation with regard to implementing computing devices. In particular, conventional transportation matching systems frequently utilize fixed or inflexible methods for generating transportation requests. For instance, many conventional systems rigidly associate a single pickup location with a particular area. Focusing rigidly on generating transportation requests comprising a single pickup location often results in inefficiencies for both provider devices and requestor devices. For example, by initiating all transportation requests at a single pickup location, conventional systems often increase delays experienced by both provider devices and requestor devices as traffic increases to and from the single pickup location.

Some conventional systems can accommodate various pick-up locations but cannot accurately address various limitations imposed at individual pick-up locations. For example, conventional systems can designate a pick-up location that is closest to a particular requestor device. However, in doing so, conventional systems fail to accurately track or satisfy limitations corresponding to that pick-up location. This can result in conventional systems being excluded from utilizing particular pick-up locations altogether and/or being forced to utilize a single pick-up location (as described above).

Conventional systems also suffer from inefficiency of operation with regard to implementing computing systems. For example, if conventional systems do allow for multiple pick-up location options, they often provide inefficient user interfaces that require significant user interactions (and corresponding processing resources) to navigate. In addition, because many conventional systems inflexibly provide a single limited option, these systems often result in unnecessary and duplicative digital communications and processing resources. For example, requesting devices often expend additional computing resources in exploring additional and/or alternative transportation options (via different applications or websites) involving different pickup locations.

Additionally, conventional transportation matching systems often operate inefficiently in matching provider devices and requestor devices. In particular, conventional systems often inefficiently utilize time, communication, and computing resources when generating transportation requests. For instance, many conventional transportation matching systems generate inefficient transportation requests that require significant time for provider devices to travel to requestor devices and significant time for requestor devices to travel to designated pickup locations. In particular, conventional systems often provide limited transportation options to a single pickup location. Because conventional systems often utilize a single pickup location, provider devices are often slowed by increased traffic to and from the designated pickup location. Furthermore, requestor devices must often travel greater distances to arrive at the pickup location. Indeed, each additional minute of inefficient time translates to multiple different queries from requestor devices (e.g., updates regarding provider device locations, duplicate digital transportation requests, queries regarding other transportation options, etc.), and provider devices (e.g., navigational queries, queries regarding alternative pickup options, etc.). Moreover, excessive travel/waiting time often results in additional digital cancellations, which leads to duplicate network traffic and computational processing (e.g., additional requests from requestor devices, communication with provider devices, and server resources in identifying duplicate matches and coordinating transportation services).

The mode management system provides several technical benefits and improvements relative to conventional systems. For example, the mode management system can improve flexibility of operation relative to conventional systems. In particular, the mode management system can flexibility identify multiple pickup locations within a multi-pickup-location area and generate location transportation modes corresponding to the pickup locations. Thus, in contrast to conventional systems that rigidly focus on generating transportation requests involving a single pickup location, the mode management system can intelligently determine when to provide alternate location transportation options for display at requestor devices. Moreover, the mode management system can flexibly provide these alternate location transportation modes only to provider devices that fall within a geofence corresponding to the multi-pickup-location area.

The mode management system can also improve accuracy relative to conventional systems. Indeed, the mode management system can not only provide alternate pickup locations, but the mode management system can intelligently provide alternate transportation pickup modes to satisfy limitations corresponding to various pickup locations. Indeed, the mode management system can monitor digital transportation requests over time corresponding to different locations within a multi-pickup-location area, compare these transportation requests to corresponding limitations imposed at these different locations, and then dynamically surface alternate location transportation modes that accurately satisfy these limitations. The mode management system can further meet limitations imposed at alternate transportation locations by dynamically controlling transportation values associated with alternate location transportation modes (which conventional systems fail to do).

Additionally, the mode management system can improve efficiency relative to conventional systems by improving user interfaces. In particular, as mentioned, the mode management system can provide an intuitive graphical user interface for presenting various transportation modes include primary and alternate location transportation options. More specifically, the mode management system can provide a graphical user interface that provides a selectable mode option for initiating an alternate location transportation mode. The mode management system can provide, via the graphical user interface, relevant information such as a difference in transportation value and the location of the alternate pickup location. In this manner, the mode management system can reduce the number of user interfaces, the amount of user interaction, and the processing resources required by many conventional systems. In addition, the mode management system can reduce computing resources utilized in exploring additional or alternate transportation options (via alternative applications or websites) involving different pickup locations.

The mode management system can also provide improvements to efficient operations relative to conventional systems. Generally, the mode management system can more efficiently utilize computing, time, and communication resources by providing additional flexible location transportation modes. More specifically, the mode management system can reduce computing inefficiencies corresponding to unnecessary travel time for both provider devices and requestor devices. Indeed, by providing additional location transportation modes associated with different pickup locations, the mode management system can effectively manage traffic to and from a number of pickup locations. By decreasing the amount of time required for both provider devices and requestor devices to travel to indicated pickup locations, the mode management system can significantly reduce unnecessary communications bandwidth, queries, and processing resources. Furthermore, the mode management system can significantly reduce the number of digital rejections and/or cancellations from requestor devices and provider devices, which further reduces the number of queries, status update requests, and other digital communication that strain network bandwidth and processing resources. In addition, by reducing cancellations, the mode management system can further improve utilization of computational resources required to determine transportation requests by avoiding duplicate and unnecessary computer matching processes.

As illustrated by the foregoing discussion, the present disclosure utilizes a variety of terms to describe features and advantages of the mode management system. Additional detail is now provided regarding the meaning of such terms. For example, as used herein, the term "transportation option" refers to a selectable user interface element corresponding to a set of characteristics or features for transportation services. In particular, a transportation option can include a selectable user interface element corresponding to a particular type of vehicle, a particular pickup time, a particular drop-off time, a particular transportation duration, a particular transportation value, etc. Additionally, a transportation option may be associated with one or more different location transportation modes, each corresponding to a different pickup location. For instance, a transportation option may be in a primary location transportation mode corresponding to a first pickup location (e.g., a parking garage). The same transportation option may also be associated with an alternate location transportation mode corresponding to an alternative or second pickup location (e.g., at a curbside spot).

As used herein, the term "pickup location" refers to a prearranged place for a provider/provider device to pick up a requestor/requestor device. In particular, a pickup location refers to a place where a provider device picks up a requestor device as part of fulfilling a transportation request. A multi-pickup-location area may include pickup locations that are located in close proximity to one another. For instance, a pickup location may comprise a curbside pickup area at an airport and/or a parking lot of the same airport.

As used herein, the term "requestor device" refers to a computing device associated with a requestor who submits a transportation request (e.g., via a dynamic transportation matching system). Typically, a requestor device includes a mobile device such as a laptop, smartphone, or tablet associated with a requestor. Requestor devices may comprise a variety of different types of computing device.

As used herein, the term "geofence" refers to a virtual boundary that defines a real-world geographic area. The continuous boundary associated with a geofence can have a variety of shapes (i.e., the shape need not be a simple or symmetric uniform boundary). In particular, a geofence can comprise an area that dictates the bounds of a multi-pickup-location area. For example, a geofence can comprise an irregular boundary about an entity such as a building, a building complex, or area.

As used herein, the term "multi-pickup-location area" refers to a region comprising two or more pickup locations. In particular, a multi-pickup-location area can comprise an area associated with a single entity with several pickup locations. For example, a multi-pickup-location area can refer to an airport with at least a curbside pickup location and a parking garage pickup location. As another example, a multi-pickup-location area can comprise a concert venue or a sports venue with multiple curbside pickup locations located at different doors of the venue.

As used herein, the term "selectable mode option" refers to a selectable user interface element corresponding to additional settings or modes for transportation services. In particular, a selectable mode option can include a selectable user interface element for presenting and initiating various location transportation modes—each associated with a particular pickup location. For example, a selectable mode option can comprise a surface toggle element for initiating an alternate location transportation mode associated with a second pickup location. In some embodiments, based on selection of the selectable mode option, the mode management system provides additional location transportation modes corresponding to a selected transportation option.

As used herein, the term "location transportation mode" refers to a distinct location setting associated with a transportation software process. In particular, a location transportation mode refers to a setting in which a transportation option for generating a transportation request is associated with a particular pickup location (or type of location). Indeed, in one or more embodiments, a transportation request is generated within a transportation matching system with an associated transportation mode. Based on user selection of various location transportation modes, the mode management system updates the pickup location associated with a selected transportation option and generates the transportation request pursuant to the corresponding location transportation mode. In one example, a primary location transportation mode is associated with a primary pickup location. Relatedly, the term "alternate location transportation mode" refers to a transportation setting associated with an alternate pickup location (e.g., a second pickup location corresponding to a limited, threshold number of transportation requests, provider devices, and/or requestor devices). Based on the initiation of an alternate location transportation mode, the mode management system updates the pickup location associated with a transportation option with a second or alternate pickup location such as a curbside spot (and generates a transportation request pursuant to the alternate transportation mode).

As used herein, the term "cumulative number of provider devices" refers to a total number of provider devices. In particular, a cumulative number of provider devices includes provider devices that have been associated with a particular pickup location within a given time period. For example, in at least one embodiment, the cumulative number of provider devices comprises a current count of provider devices or the number of provider devices that have traveled to and picked up requestor devices at a particular pickup location within a given time period. In some embodiments, the cumulative number of provider devices also comprises a predicted count of provider devices or provider devices that the mode management system determines will travel to a pickup location within the given time period.

As indicated above, this disclosure includes illustrative figures portraying example embodiments and implementations of the mode management system. In accordance with one or more embodiments, FIG. 1 illustrates a schematic diagram of a system environment 100 (or "environment 100") in which a mode management system 114 can operate. As illustrated in FIG. 1, the environment 100 includes one or more server(s) 110 comprising a dynamic transportation matching system 112 that can communicate via a network 122 with a requestor device 116, a provider device 102, and a third-party server 120. The server(s) 110 can include one or more computing devices to implement the mode management system 114. Additional description regarding the various computing devices (e.g., the server(s) 110, the third-party server 120, the provider device 102, and/or the requestor device 116) is provided below with respect to FIGS. 9 and 11.

As illustrated in FIG. 1, the server(s) 110 may generate, store, receive, and transmit various types of data including data relating to user devices, transportation requests, provider vehicles, transit vehicles, and other data. The mode management system 114 may use the server(s) 110 to communicate with various computing devices. For example, the server(s) 110 receive data including indications of transportation requests as well as location information from the requestor device 116. The server(s) 110 may also receive location information from and transmit transportation request information to the provider device 102. The server(s) 110 can receive transit information from the dynamic transportation matching system 112. Additionally, the server(s) 110 can send data to the requestor device 116 including transportation options, transportation values, transit route information, location transportation modes, and other relevant transit data. The server(s) 110 may comprise one or more server devices that implement the dynamic transportation matching system 112. The server(s) 110 may also comprise a communication server or a web-hosting server.

In one or more embodiments, the server(s) 110 can include or implement all or a portion of the dynamic transportation matching system 112. The dynamic transportation matching system 112 receives transportation requests including destination locations and desired pickup locations from the requestor device 116. For example, the dynamic transportation matching system 112 receives a location of the requestor device 116. The dynamic transportation matching system 112 analyzes the transportation requests and identifies provider devices to fulfill the transportation request. For example, the dynamic transportation matching system 112 matches a transportation request corresponding with the requestor device 116 to the provider device 102 based on availability information and location information from the provider device 102*a* and the requestor device 116.

As further shown in FIG. 1, the server(s) 110 may include or implement all or a portion of the mode management system 114. As indicated above, in some cases, the mode management system 114 initiates an alternate location transportation mode for a transportation request from the requestor device 116. For instance, the mode management system 114 can provide, to the requestor device 116, a transportation option corresponding to a first pickup location. The mode management system 114 can also receive location information from the requestor device 116 and determine that the requestor device 116 is associated with a location within a geofence corresponding to a multi-pickup-location area. Furthermore, the mode management system 114 can determine to provide a selectable mode option for initiating an alternate location transportation mode. Based on receiving a user interaction with the selectable mode option, the mode management system 114 can initiate the alternate location transportation mode by modifying the first pickup location to an alternate second pickup location. Furthermore, the mode management system 114 can intelligently determine whether to provide the selectable mode option based on analyzing a threshold number of provider devices associated with specific pickup locations.

As further shown in FIG. 1, the environment 100 includes the requestor device 116 (e.g., associated with a requestor). The requestor device 116 collects, stores, and communicates data to the dynamic transportation matching system 112 or the mode management system 114 and other computing devices within the environment 100. For example, the requestor device 116 sends transportation requests and location data to the dynamic transportation matching system 112 or the mode management system 114 and receives transportation options and corresponding information from either system. Additionally, the requestor device 116 sends, to the dynamic transportation matching system 112 an indication of a selection of transportation options and location transportation modes.

As further indicated in FIG. 1, the requestor device 116 includes the requestor application 118. In some embodiments, the requestor application 118 comprise web browsers, applets, or other software applications (e.g., native applications) available to the requestor device 116. Additionally, in some instances, the dynamic transportation matching system 112 provides data including instructions that, when executed by the requestor device 116, create or otherwise integrate requestor applications within an application or webpage.

Additionally, the requestor device 116 can include computer-executable instructions that (upon execution) cause the requestor device 116 to communicate with the mode management system 114 to present one or more graphical user interfaces for the requestor application 118. For example, in at least one embodiment, the requestor device 116 presents a transportation option user interface comprising various elements including transportation options as well as data corresponding to each transportation option such as transportation values, estimated duration, estimated time of arrival, and other data. Furthermore, the requestor device 116 presents a mode selection user interface comprising various location transportation modes linked to different pickup locations.

As further shown in FIG. 1, the environment 100 includes the provider device 102. Generally, the provider device 102 communicates with the dynamic transportation matching system 112 or the mode management system 114. For example, the provider device 102 transmits, to the dynamic transportation matching system 112 or the mode management system 114, location information, and the provider device 102 receives transportation request data required to fulfill a transportation request. For instance, the provider device 102 receives information regarding the requestor device 116, a pickup location, a desired destination location, the number of anticipated passengers, and other relevant information. The provider device 102 can be associated with a provider and/or be attached to (or integrated within) a provider vehicle.

In some embodiments, the dynamic transportation matching system 112 communicates with the provider device 102 through the provider application 104. For instance, the dynamic transportation matching system 112 can transmit, via the provider application 104, route data to navigate to a pickup location to pick up the requestor device 116, navigate to the destination location, and/or collect fares.

As illustrated in FIG. 1, the environment 100 includes a number of computing devices. As suggested above, the provider device 102 and the requestor device 116 may comprise a mobile device such as a laptop, smartphone, or tablet associated with a provider or the requestor, respectively. The provider device 102 and the requestor device 116 may comprise a variety of computing devices as further explained below with reference to FIG. 11.

In one or more embodiments, the provider device 102 (or the requestor device 116) corresponds to one or more user accounts (e.g., user accounts stored at the server(s) 110). For example, a user of the provider device 102 (or the requestor device 116) can establish a user account with login credentials and a provider of the provider device can establish a provider account with login credentials. These user accounts can include a variety of information regarding requestors/providers, including user information (e.g., name, telephone number, etc.), vehicle information (e.g., vehicle type, license plate number), device information (e.g., operating system, memory or processing capability), payment information, purchase history, transportation history, etc. Different accounts can also include various privileges associated with requestors and providers (e.g., privileges to access certain functionality via the transportation matching application, to provide transportation services, to submit transportation requests, etc.). The dynamic transportation matching system 112 can manage the provider device 102 (and requestor devices) based on appropriate privileges associated with the corresponding user accounts (e.g. provider accounts and/or requestor accounts). Accordingly, providers (and/or requestors) can utilize multiple devices (e.g., multiple provider devices or multiple requestor devices) with the appropriate privileges associated with the corresponding accounts.

The present disclosure utilizes provider devices (and requestor devices) to include devices associated with these user accounts. Thus, in referring to a provider device (or a requestor device), the disclosure and the claims are not limited to communications with a specific device, but any device corresponding to an account of a particular user. Accordingly, in using the term provider device, this disclosure includes any computing device corresponding to a provider account. Similarly, in using the term requestor device, this disclosure includes any computing device corresponding to a requestor account.

As further shown in FIG. 1, the environment 100 includes the third-party server 120. The third-party server 120 can communicate with the server(s) 110 via the network 122. In particular, the dynamic transportation matching system 112 and/or the mode management system 114 can communicate with the third-party server 120 to access data relevant to a multi-pickup-location area. In some embodiments, the third-party server 120 comprises a server associated with a multi-pickup-location area. For example, the third-party server 120 can send, to the dynamic transportation matching system 112 and/or the mode management system 114, the coordinates of pickup locations within the multi-pickup-location area, a threshold number of provider devices associated with pickup locations, and other data relevant to the multi-pickup-location area.

Although not illustrated in FIG. 1, in some embodiments, the environment 100 may have a different arrangement of components and/or may have a different number or set of components altogether. In certain implementations, for instance, one or more of the provider vehicles associated with the provider device 102 do not require a human operator but are instead autonomous transportation vehicles—that is, self-driving vehicles that include computer components and accompanying sensors for driving without manual-provider input from a human operator. As a further example, in some embodiments, the provider vehicle comprises a hybrid self-driving vehicle with both self-driving functionality and some human operator interaction. Moreover, although the environment 100 illustrates the mode management system 114 implemented on the server(s) 110, the mode management system 114 can be implemented (in whole or in part) on other devices (e.g., as part of the requestor device 102 or the requestor device 116)

When one or more provider vehicles associated with the provider device 102 comprises an autonomous vehicle or hybrid self-driving vehicle, the provider vehicle may include additional components not depicted in FIG. 1. Such components may include location components, one or more sensors by which the autonomous vehicle navigates, and/or other components necessary to navigate without a human operator (or with minimal interactions with a human operator).

Figure 2:
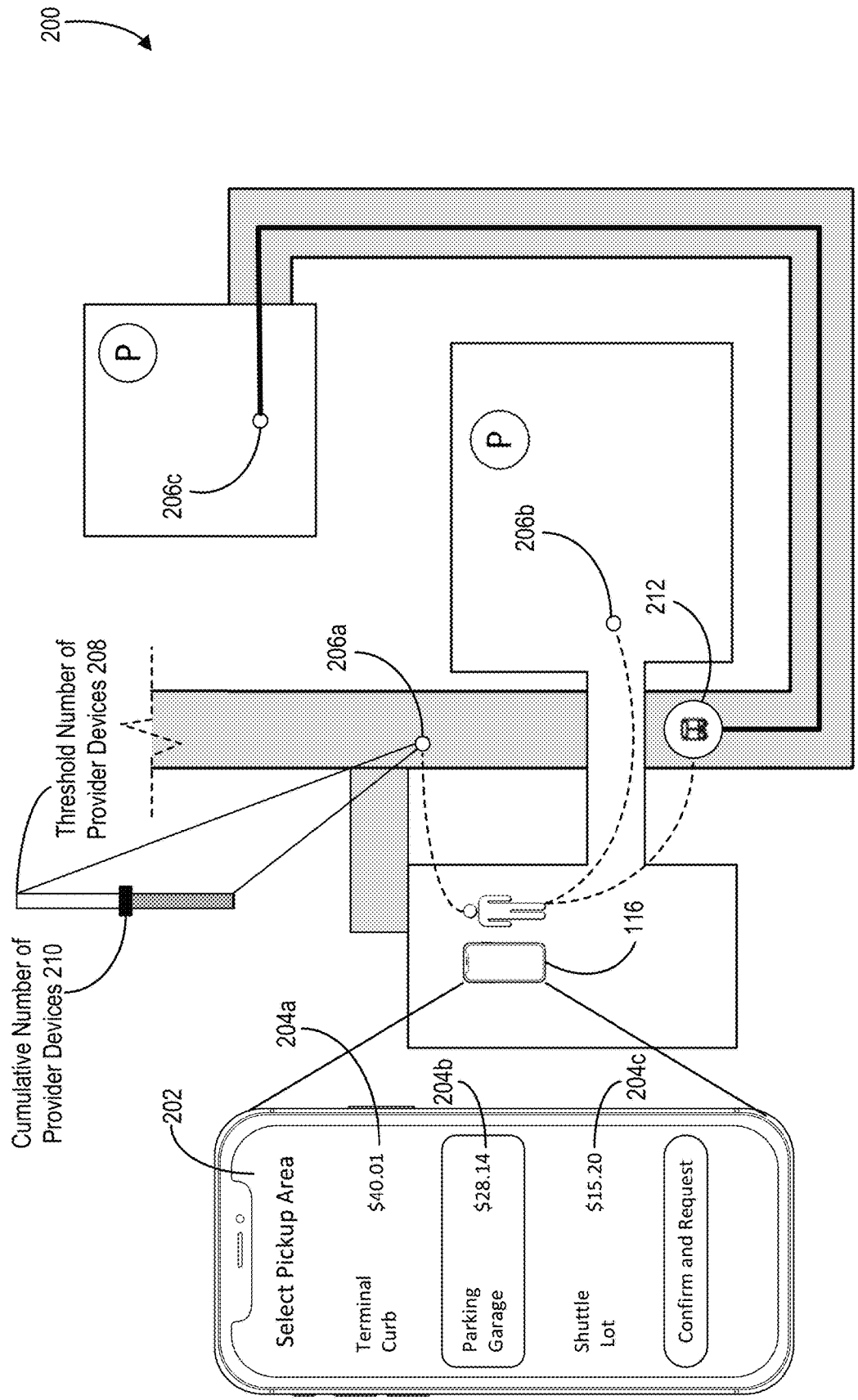
FIG. 2 illustrates a schematic diagram depicting a multi-pickup-location area comprising multiple pickup locations in accordance with one or more embodiments of the present disclosure.

As mentioned previously, the mode management system 114 can associate a provider device and/or transportation request with a location transportation mode. In particular, to assist in managing limitations corresponding to various locations, the mode management system 114 links each location transportation mode with a pickup location. FIG. 2 illustrates an example multi-pickup-location area comprising various pickup locations with which the mode management system 114 associates different location transportation modes in accordance with one or more embodiments. In particular, FIG. 2 illustrates a multi-pickup-location area 200 including pickup locations 206a-206c and the requestor device 116.

As illustrated in FIG. 2, the mode management system 114 determines that the multi-pickup-location area 200 includes the pickup locations 206a-206c. As mentioned previously, the pickup locations 206a-206c comprise different places at which a provider device can pick up the requestor device 116 as part of fulfilling a transportation request. In some embodiments, the mode management system 114 determines the coordinates of the pickup locations 206a-206c based on past ride request data to the multi-pickup-location area 200. In one or more embodiments, the mode management system 114 receives the coordinates of the pickup locations 206a-206c from the third-party server 120 associated with the multi-pickup-location area 200. The pickup locations 206a-206c are located varying distances from the requestor device 116 and are accordingly associated with varying levels of convenience with respect to the requestor device 116. For example, as illustrated, the pickup location 206a comprises a spot at a terminal curb that is in close proximity to the requestor device 116. The pickup location 206b comprises a spot at a parking garage that is located farther away from the requestor device 116 than the pickup location 206a. Finally, the requestor device 116 must travel the farthest distance and also take a shuttle 212 to travel to the pickup location 206c, which comprises a spot within shuttle lot.

Additionally, one or more of the pickup locations 206a-206c may be associated with restrictions on provider devices. In particular, one or more of the pickup locations 206a-206c may be associated with threshold numbers of provider devices. The pickup locations 206a-206c may have properties or characteristics that physically limit the amount of traffic that can efficiently access the pickup locations 206a-206c. For example, and as illustrated in FIG. 2, the pickup location 206a is located at a curb of the multi-pickup-location area 200. The route leading to the pickup location 206a is characterized by a limited multi-lane road that may become congested given excessive traffic. Thus, the mode management system 114 may determine that the pickup location 206a is associated with a threshold number of provider devices 208a. Furthermore, though not illustrated in FIG. 2, the pickup location 206c may be associated with a threshold number of provider devices dictated by a maximum number of passengers that a shuttle 212 can transport to the pickup location 206a within a given period of time. Other pickup locations associated with fewer or no physical limitations may not be associated with a threshold number of provider devices. For example, and as illustrated in FIG. 2, the pickup location 206a is not associated with a threshold number of provider devices.

Figure 4:
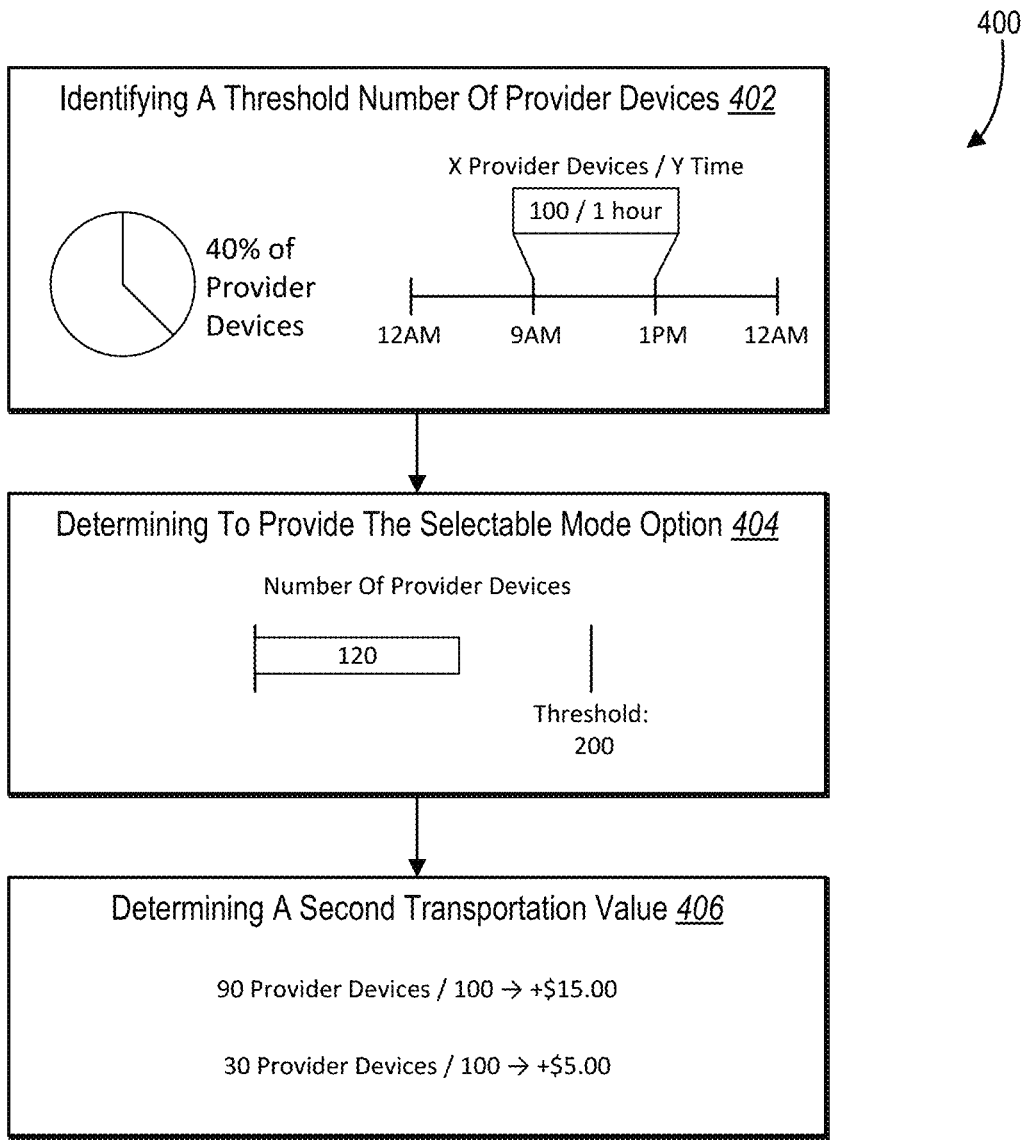
FIG. 4 illustrates a diagram of determining a cumulative number of provider devices and determining a second transportation value in accordance with one or more embodiments of the present disclosure.

The threshold number of provider devices comprises a limit (e.g., maximum) of provider devices that can travel to and access a particular pickup location. In some embodiments, a threshold number of provider devices comprises a set number of provider devices that can travel to a pickup location in a given period of time. For instance, the threshold number of provider devices 208a can comprise a limit of 200 provider devices from 5 pm to 7 pm and a limit of 150 provider devices from 7 pm to 10 pm. In other embodiments, the threshold number of provider devices 208a comprises a percentage or proportion of provider devices. For example, the threshold number of provider devices 208a can comprise 40% of all provider devices dispatched by the dynamic transportation matching system 112 within a given time period (e.g., an hour, a few hours, a day, etc.). In another example, the threshold number of provider devices 208a comprises a percent of provider devices dispatched to the multi-pickup-location area 200 by the dynamic transportation matching system 112 within a given time period. FIG. 4 and the corresponding discussion provide additional detail regarding the threshold number of provider devices in accordance with one or more embodiments.

The mode management system 114 associates pickup locations with location transportation modes. To illustrate, the mode management system 114 associates each of the pickup locations 206a-206c with location transportation modes 204a-204c displayed via a mode selection user interface 202 of the requestor device 116. The mode management system 114 associates the location transportation mode 204a with the pickup location 206a, the location transportation mode 204b with the pickup location 206b and the location transportation mode 204c with the pickup location 206b. As illustrated in FIG. 2, the location transportation modes 204a-204c comprise an identifier for the corresponding pickup location (e.g., terminal curb, parking garage, and shuttle lot) as well as corresponding transportation values.

In one or more embodiments, the mode management system 114 determines to provide additional location transportation modes based on the threshold number of provider devices associated with the pickup locations. Generally, the mode management system 114 will not provide a location transportation mode associated with a pickup location when the threshold number of provider devices has been met or passed. As illustrated in FIG. 2, the mode management system 114 compares a cumulative number of provider devices 210 with the threshold number of provider devices 208 of the pickup location 206a. Generally, the cumulative number of provider devices 210 indicates a number of provider devices that have traveled to the pickup location 206a over a period of time associated with the threshold number of provider devices 208a. For example, the cumulative number of provider devices 210 indicates that 65 provider devices have picked up requestor devices at the pickup location 206a so far between the hours of 6 am and 7 am. As further illustrated, the cumulative number of provider devices 210 satisfies (e.g., falls within) the threshold number of provider devices 208 comprising 100 provider devices. Based on determining that the cumulative number of provider devices 210 satisfies the threshold number of provider devices 208, the mode management system 114 determines to provide the location transportation mode 204a corresponding to the pickup location 206a for display via the mode selection user interface 202.

As illustrated in FIG. 2, the mode management system 114 may designate a primary location transportation mode and one or more alternate location transportation modes. In particular, to effectively manage provider device traffic to and from pickup locations, the mode management system 114 determines pickup locations with no or a high threshold number of provider devices and designates the corresponding location transportation modes as the primary location transportation mode. For example, the mode management system 114 determines that the pickup location 206b is not associated with a threshold number of provider devices. Based on this determination, the mode management system 114 designates the location transportation mode 204b as the primary location transportation mode. The mode management system 114 also presents alternate location transportation modes. For example, the mode management system 114 provides the location transportation modes 204a and 204c for display via the mode selection user interface 202. In some embodiments, the mode management system 114 presents the location transportation modes 204a and 204c based on user interaction with a selectable mode option. As illustrated, the alternate location transportation modes (e.g., the location transportation modes 204a and 204c) are associated with different transportation values than the primary location transportation mode (e.g., the location transportation mode 204b).

Figure 3B:
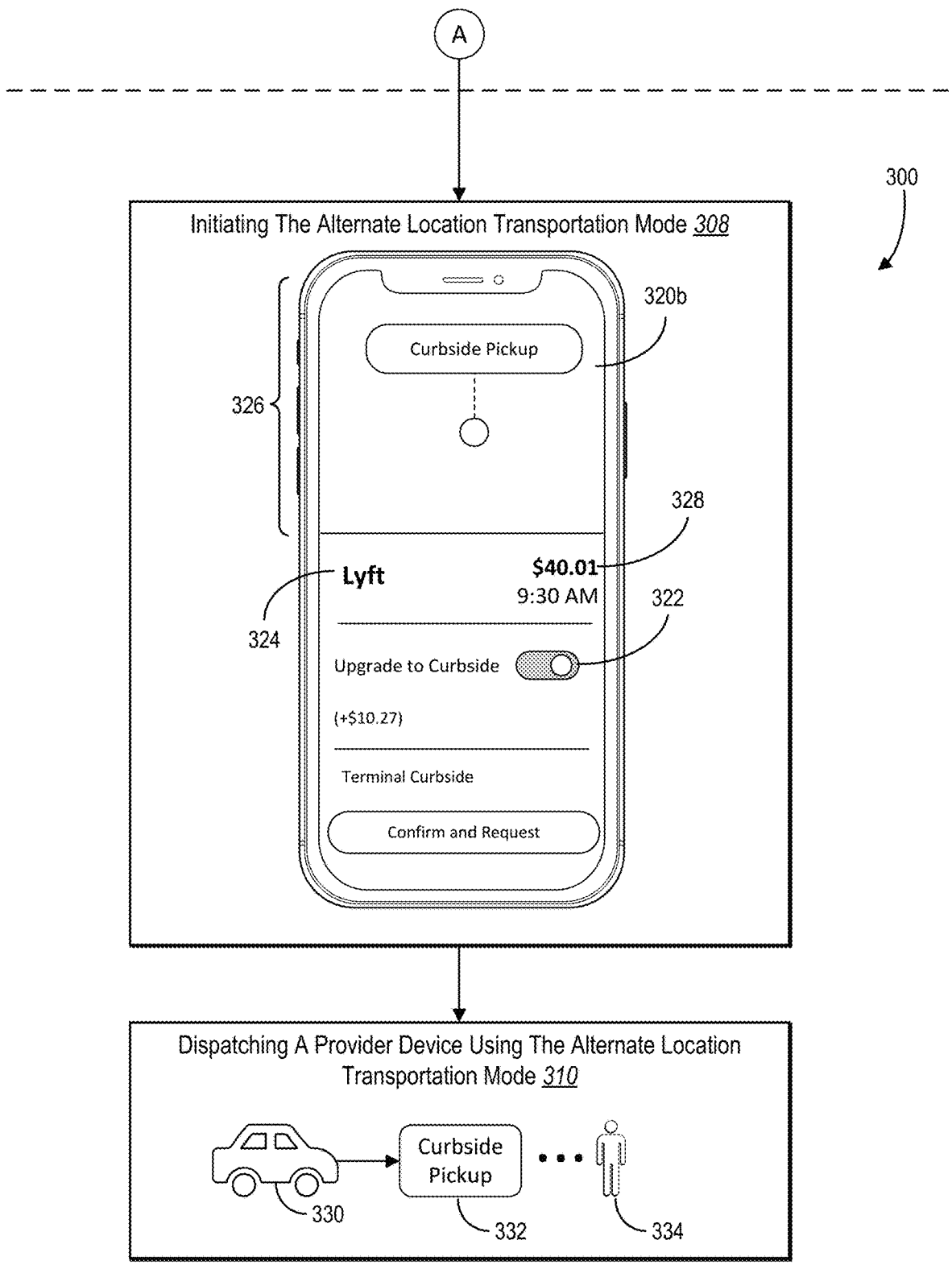

FIG. 2 illustrates an overview of an environment comprising the multi-pickup-location area 200, the pickup locations 206a-206c, and the requestor device 116 in accordance with one or more embodiments. FIGS. 3A-3B provides additional detail regarding how the mode management system 114 initiates an alternate location transportation mode in accordance with one or more embodiments. In particular, FIGS. 3A-3B illustrate a series of acts 300 for initiating the alternate transportation mode. The series of acts 300 includes an act 302 of providing a transportation option corresponding to a first pickup location, an act 304 of determining that the device is associated with a location within a geofence, an act 306 of providing a selectable mode option for initiating an alternative location transportation mode, an act 308 of initiating the alternate location transportation mode, and an act 310 of dispatching a provider device using the alternate location transportation mode.

As illustrated in FIG. 3A, the mode management system 114 performs the act 302 of providing a transportation option corresponding to a first pickup location. In particular, the mode management system 114 can provide one or more transportation options for fulfilling a transportation request submitted by the requestor device 116. As illustrated, the mode management system 114 provides transportation options 312a-312c via a transportation option user interface 314. Each of the transportation options 312a-312c is associated with a first pickup location within the multi-pickup-location area. In some embodiments, the first pickup location comprises a primary pickup location that the mode management system 114 is associated with either no or a high threshold number of provider devices. Furthermore, the transportation options 312a-312c are associated with transportation values. More specifically, the mode management system 114 assigns different transportation values to different transportation options based on the type of vehicle such as a sedan (e.g., "Lyft" transportation option) or a larger vehicle such as an SUV (e.g., "Lyft XL"). The mode management system 114 also assigns different transportation values based on the type of transportation request. For instance, the mode management system 114 assigns a greater transportation value to a private ride (e.g., "Lyft," or "Lyft XL") versus a shared ride (e.g., "Shared").

In one or more embodiments, as part of performing the act 302 of providing a transportation option corresponding to a first pickup location, the mode management system 114 provides a single transportation option. For example, in at least one embodiment, as part of performing the act 302, the mode management system 114 provides the graphical user interface illustrated in the act 306 below. In particular, the mode management system 114 provides a graphical user interface comprising a single transportation option 324 associated with a primary location transportation mode.

The series of acts 300 includes the act 304 of determining that the device is associated with a location within a geofence. In one or more embodiments, the mode management system 114 uses various methods to determine that a device is associated with a location within a geofence (e.g., that a pickup location is within a geofence corresponding to the multi-pickup location area). For example, the mode management system 114 determines that the requestor device 116 is located within a geofence 318 corresponding to a multi-pickup-location area. The geofence 318 comprises a predefined set of boundaries around a multi-pickup-location area. In some embodiments, the mode management system 114 utilizes GPS, RFID, Wi-Fi, cellular, or other data from the requestor device 116 to determine the location of the requestor device 116. By comparing the location of the requestor device 116 with the geofence 318, the mode management system 114 determines that the requestor device 116 is located within the bounds of the geofence 318. In at least one embodiment, the mode management system 114 does not provide a selectable mode option to requestor devices that are located outside of the geofence 318. Additionally, or alternatively, the mode management system 114 determines that a transportation request submitted by the requestor device 116 includes a pickup location within the latitude and longitude defined by the geofence 318. Thus, the mode management system 114 can determine that the requestor device 116 is associated with a location within a geofence if the transportation request indicates a pickup location within the geofence 318, even if the requestor device 116 is not itself located within the geofence 318.

The mode management system 114 may utilize various methods to determine the geofence 318 corresponding to a multi-pickup-location area. In some embodiments, the mode management system 114 determines coordinates for the multi-pickup-location area and determines a radius for the geofence 318 that encompasses the multi-pickup-location area. In other embodiments, the mode management system 114 communicates with the third-party server 120 to access coordinates for boundaries associated with the multi-pickup-location area. Thus, the mode management system 114 can determine polygonal boundaries for the geofence 318. In some embodiments, the multi-pickup-location area does not correspond directly with the fixed boundary of a building. For example, the mode management system 114 can determine that an international terminal of an airport comprises a single pickup location while the domestic terminal of the same airport comprises a multi-pickup-location area. Thus, the mode management system 114 defines a geofence about the domestic terminal while excluding the international terminal.

As illustrated in FIG. 3A, the mode management system 114 further performs the act 306 of providing a selectable mode option for initiating an alternate location transportation mode. Generally, the selectable mode option comprises a selectable element associated with additional selectable modes. For example, and as illustrated in FIG. 3A, the mode management system 114 provides, via a mode selection user interface 320*a*, a selectable mode option 322 for providing additional location transportation modes for a given transportation option 324. As illustrated, the selectable mode option 322 may comprise a toggle element. Based on user selection of the toggle element, the mode management system 114 can provide data associated with one or more alternate location transportation modes via the mode selection user interface.

While FIG. 3A illustrates the selectable mode option 322 comprising a single toggle element, the selectable mode option 322 may comprise a variety of additional user interface elements (including non-toggle options, such as a radio button). For instance, in one embodiment, the mode selection user interface 320*a* includes additional toggles, each associated with a different location transportation mode. In some embodiments, the selectable mode option 322 comprises the transportation options 312*a*-312*b*. In particular, based on selection of one of the transportation options 312*a*-312*b*, the mode management system 114 may provide, for display via the mode selection user interface 320*a*, a list of location transportation modes corresponding to the selected transportation option, each associated with a different pickup location.

As illustrated in FIG. 3B, the mode management system 114 performs the act 308 of initiating the alternate location transportation mode. Generally, based on receiving a user interaction with the selectable mode option 322, the mode management system 114 initiates the alternate transportation mode. As mentioned previously, the alternate transportation mode corresponds to an alternate transportation location (i.e., a second transportation location). When the mode management system 114 initiates the alternate transportation mode, the mode management system 114 modifies the pickup location to the second pickup location and updates various elements on the graphical user interface to reflect data associated with the alternate location transportation mode. In particular, the mode management system 114 updates the graphical user interface to display the second pickup location. Furthermore, the mode management system 114 determines an alternate transportation value (i.e., a second transportation value) associated with the transportation option. Additionally, the mode management system 114 updates a provider device ETA to reflect an anticipated time for a provider device to arrive at the alternate transportation location. For example, as illustrated in FIG. 3B, the mode management system 114 provides a mode selection user interface 320 comprising the transportation option 324 associated with second transportation value 328. Furthermore, the mode management system 114 modifies the pickup location to the alternate or second pickup location. Accordingly, the mode management system 114 updates a map element 326 to indicate the modification in the pickup location.

As further illustrated in FIG. 3B, the mode management system 114 performs the act 310 of dispatching a provider device using the alternate location transportation mode. In particular, the mode management system 114 generates a transportation request that corresponds to the alternate location transportation mode and associates a provider device with the alternate location transportation mode so that the provider device will transport the requestor device from the pickup location to the destination location. In one embodiment, based on receiving a user confirmation of the alternate location transportation mode, the mode management system 114 dispatches a provider device associated with the provider vehicle 330 to a second pickup location 332 corresponding to the alternate location transportation mode. In one example, the mode management system 114 sends, to a selected identified provider device, transportation request data required to pick up the requestor device. For example, the mode management system 114 sends, to the provider device, information including the second pickup location, information identifying the requestor associated with the requestor device, and any other relevant information. The mode management system 114 also sends instructions to the requestor device associated with a requestor 334 to travel to the second pickup location 332. In another example, the mode management system 114 preemptively dispatches a number of provider devices to the second pickup location 332. The mode management system 114 may initiate a ride request when the requestor 334 enters the provider vehicle 330 at the second pickup location 332.

FIGS. 3A-3B provide an overview of acts by which the mode management system 114 initiates an alternate transportation mode. The following figures and corresponding discussion provide additional detail with respect to individual acts described above in FIGS. 3A-3B. For instance, FIG. 4 illustrates how the mode management system 114 determines a second transportation value corresponding to the alternate location transportation mode in accordance with one or more embodiments. More specifically, FIG. 4 illustrates a series of acts 400 comprising an act 402 of identifying a threshold number of provider devices, an act 404 of determining to provide the selectable mode option, and an act 406 of determining a second transportation value.

As illustrated in FIG. 4, the mode management system 114 performs the act 402 of identifying a threshold number of provider devices. The mode management system 114 can determine a threshold number of provider devices utilizing various methods. In some embodiments, the mode management system 114 determines the threshold number of provider devices by communicating with the third-party server 120 associated with the multi-pickup-location area 200. For example, the mode management system 114 can receive the threshold number of provider devices 208 from the third-party server 120. In some embodiments, the mode management system 114 defines a threshold number of provider devices 208 associated with the pickup location 206a. In one example, the mode management system 114 may access and analyze historical provider device data to identify traffic limitations associated with the pickup location 206a. More specifically, the mode management system 114 can retrieve historical provider device data to determine whether provider device travel time to the pickup location 206a meets a predetermined threshold within peak hours. The mode management system 114 may then determine the threshold number of provider devices 208 by estimating a number or proportion of provider devices that may efficiently travel to the pickup location 206a within a given time period.

In some embodiments, the mode management system 114 determines that a pickup location is associated with a percentage of provider devices. The mode management system 114 determines the threshold number of provider devices based on the identified percentage of provider devices. For instance, and as illustrated in FIG. 4, the mode management system 114 determines that no more than 40% of provider devices dispatched to the multi-pickup-location area may travel to the pickup location. In order to determine the threshold number of provider devices, the mode management system 114 predicts the total number of provider devices that will be dispatched to the multi-pickup-location area within a given time period. For instance, the mode management system 114 accesses historical provider device data to predict a total number of provider devices that will likely be dispatched to the multi-pickup-location area. The mode management system 114 determines the threshold number of provider devices by applying the identified percentage (e.g., 40%) to the total number of provider devices.

In one or more embodiments, the mode management system 114 directly accesses a threshold number of provider devices comprising a number of provider devices that may travel to a pickup location within a given time period. The mode management system 114 can identify x number of provider devices that may travel to the pickup location over y period of time. Furthermore, the mode management system 114 can identify different threshold numbers of provider devices at different time slots within a day. For example, and as illustrated, the mode management system 114 identifies the threshold number of provider devices of 100 provider devices per hour for the hours 9 am and 1 pm. The mode management system 114 can identify different threshold numbers of provider devices for different time slots (e.g., 8 pm-10 pm) within a day.

Figure 5:
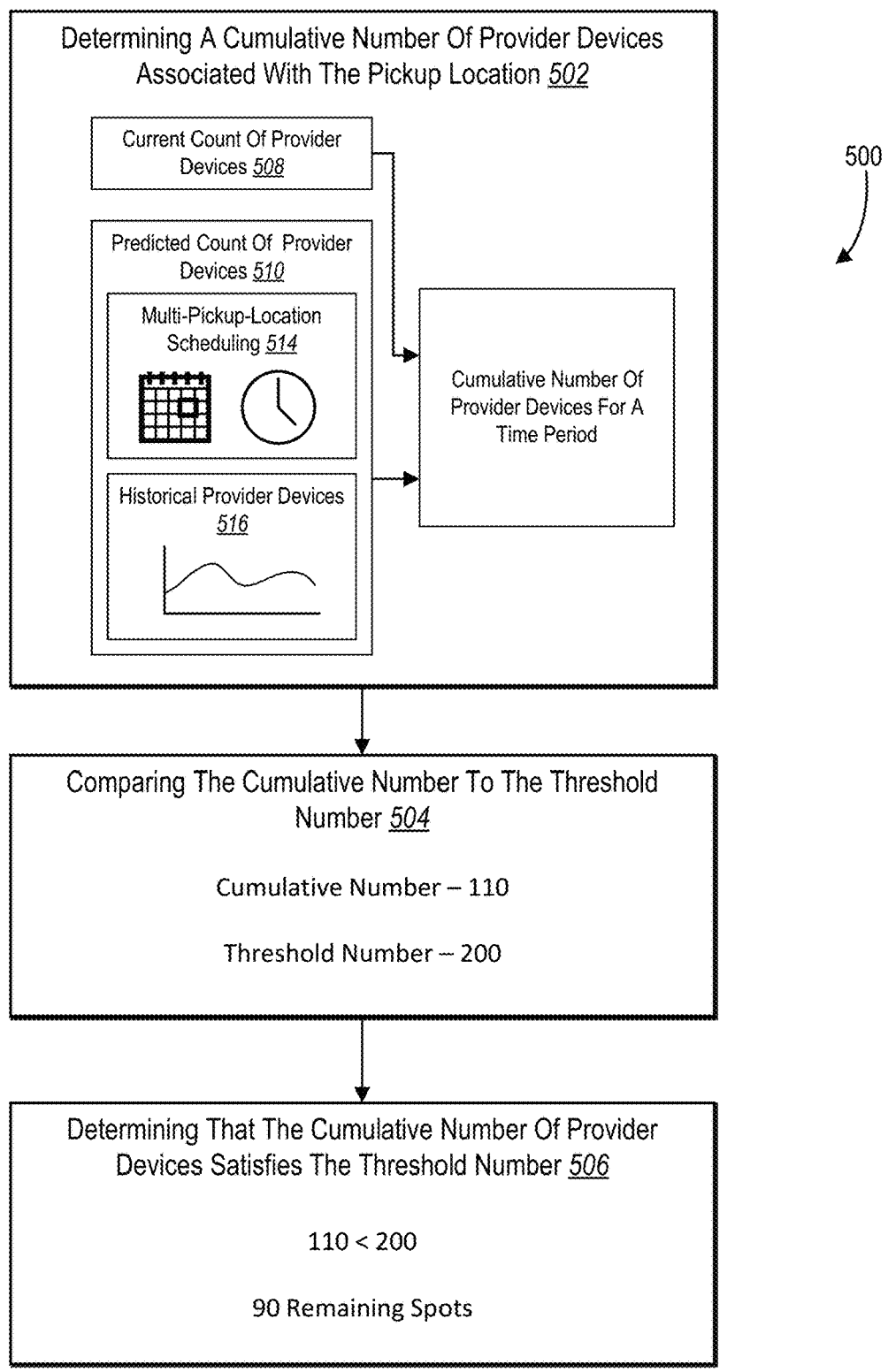
FIG. 5 illustrates a diagram of determining that a cumulative number of provider devices satisfies a threshold number of provider devices in accordance with one or more embodiments of the present disclosure.

As further illustrated in FIG. 4, the mode management system 114 performs the act 404 of determining to provide the selectable mode option. In particular, the mode management system 114 can determine to provide the selectable mode option based on the identified threshold number of provider devices. Generally, if the number of provider devices that have traveled to a pickup location meets or exceeds threshold number of provider devices for a time period, the mode management system 114 will not provide an option to select the location transportation mode corresponding to the pickup location. Thus, in at least one embodiment, the mode management system 114 determines to provide the selectable mode option by simply comparing the number of provider devices that have traveled to a particular pickup location (i.e., the second pickup location) with the threshold number of provider devices associated with the particular pickup location. For example, as illustrated in FIG. 4, the mode management system 114 determines that 120 provider devices that have accessed the second pickup location within a time period. The mode management system 114 further determines that 120 provider devices satisfies the threshold number of 200 provider devices associated with the second pickup location. FIG. 5 and the corresponding discussion provide additional detail relating to determining that a cumulative number of provider devices satisfies the threshold number of provider devices.

Figure 6:
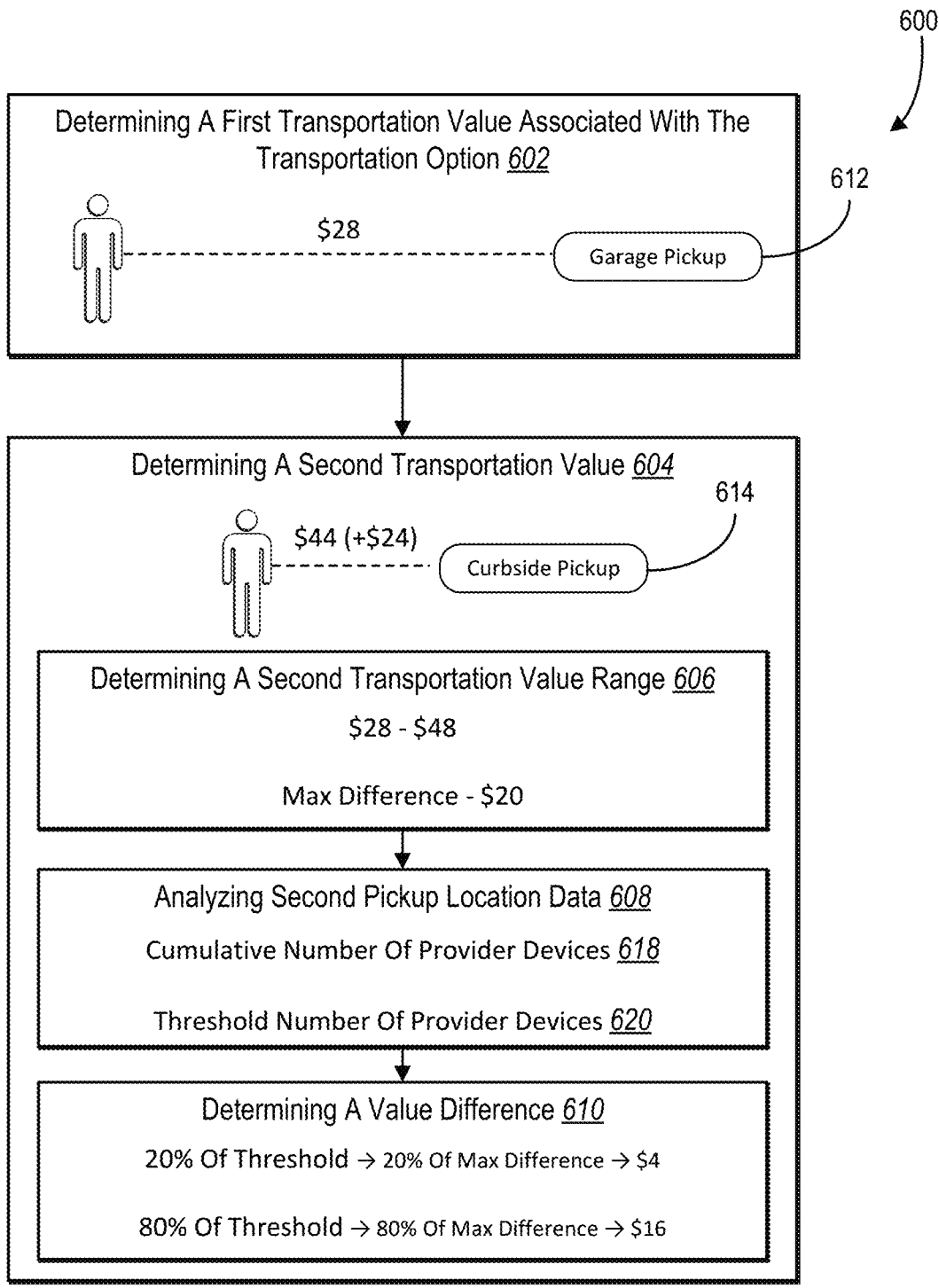
FIG. 6 illustrates a diagram of determining a first transportation value and a second transportation value in accordance with one or more embodiments of the present disclosure.

The mode management system 114 also performs the act 406 of determining a second transportation value. Generally, the mode management system 114 can control the traffic to a second pickup location by intelligently determining a transportation value. For instance, the mode management system 114 might deter a number of requestor devices that select an alternate location transportation mode by increasing the price associated with the alternate location transportation mode. Thus, the mode management system 114 can control the number of provider devices that will travel to the second pickup location associated with the alternate transportation mode by adjusting the second transportation value. In particular, based on determining that a cumulative number of provider devices associated with the pickup location is within a set range of the threshold number of provider devices, the mode management system 114 can associate a higher transportation value with the alternate location transportation mode. For example, and as illustrated in FIG. 4, the mode management system based on determining that the cumulative number of provider devices equals 90 and that the threshold number of provider devices equals 100, the mode management system 114 determines a second transportation value that is $15 greater than the first transportation value. In contrast, based on determining that only 30 provider devices have traveled to the second pickup location associated with the 100 threshold number of provider devices, the mode management system 114 determines a second transportation value that is only $5 greater than the first transportation value. FIG. 6 and the corresponding discussion provide additional detail relating to how the mode management system 114 determines the second transportation value in accordance with one or more embodiments.

As mentioned previously, the mode management system 114 can determine to provide a selectable mode option upon determining that a cumulative number of provider devices satisfies (e.g., falls below) a threshold number of provider devices. FIG. 5 illustrates how the mode management system 114 determines that a cumulative number of provider devices satisfies the threshold number of provider devices in accordance with one or more embodiments. In particular, FIG. 5 illustrates a series of acts 500 including an act 502 of determining a cumulative number of provider devices associated with the pickup location, an act 504 of comparing the cumulative number to the threshold number, and an act 506 of determining that the cumulative number of provider devices satisfies the threshold number.

As illustrated in FIG. 5, the mode management system 114 performs the act 502 of determining a cumulative number of provider devices associated with the pickup location. As mentioned previously, the cumulative number of provider devices comprises a total number of provider devices that have been associated with a particular pickup location within a given time period. The cumulative number of provider devices count toward the threshold number of provider devices. In one embodiment, a cumulative number of provider devices for a time period comprises a current count of provider devices 508. In particular, the current count of provider devices 508 comprises the total number of provider devices that have traveled to the pickup location within the given time period. For instance, in one embodiment, and as illustrated in FIG. 5, the mode management system 114 determines that the current count of provider devices equals 60 provider devices.

In some embodiments, the mode management system 114 determines a cumulative number of requestor devices associated with a pickup location. For example, the mode management system 114 determines a threshold number of requestor devices associated with a pickup location. To illustrate, to avoid overcrowding requestors at a particular pickup location, the mode management system 114 determines the threshold number of requestor devices based on how many requestors can be reasonably spaced at the particular pickup location. Accordingly, the mode management system 114 determines a cumulative number of requestor devices that have traveled to the pickup location within a given time period. Similar to the description with regard to provider devices, the mode management system 114 can dynamically determine transportation values and/or determine when to surface alternate transportation modes by comparing the provider devices with a threshold number of provider devices.

Additionally, some embodiments the mode management system 114 determines the cumulative number of provider devices based on a predicted count of provider devices 510. Generally, the predicted count of provider devices 510 comprises provider devices that the mode management system 114 predicts will be dispatched to the pickup location within a given time period. In one embodiment, the mode management system 114 determines a predicted count of provider devices that will travel to the pickup location based on the predicted count of provider devices that travel to the multi-pickup-location generally. For instance, the mode management system 114 can predict that a proportion of predicted provider devices will select a location transportation mode associated with a particular pickup location. In some embodiments, the mode management system 114 makes this prediction based on a fixed percentage (e.g., 30%) of provider devices that the mode management system 114 predicts will be dispatched specifically to the pickup location. In at least one embodiment, the mode management system 114 determines the fixed percentage based on historical provider device data.

The mode management system 114 can determine the predicted count of provider devices 510 based on multi-pickup-location scheduling 514 and/or historical provider devices 516. In some embodiments, the mode management system 114 communicates with the third-party server 120 to access multi-pickup-location scheduling. For example, the mode management system 114 can access event dates and times for a venue or flight schedules for an airport. Additionally, the mode management system 114 may determine the predicted count of provider devices 510 based on historical provider devices 516. In particular, the mode management system 114 analyzes historical provider device data to determine past numbers of provider devices that have traveled to a particular pickup location or to the multi-pickup-location generally. For example, the mode management system 114 can access provider device data corresponding to the pickup location for the same time period in previous days, months, years, etc. The mode management system 114 may designate either the current count of provider devices 508 or the predicted count of provider devices 510 as the cumulative number of provider devices for a time period.

In some embodiments, the mode management system 114 utilizes a machine learning model to generate the predicted count of provider devices 510. In particular, the mode management system 114 may modify parameters for and utilize a machine learning model such as a neural network (e.g., an LSTM) or decision tree. For example, the mode management system 114 may use training data relating to the pickup location such as the multi-pickup-location scheduling 514 and the historical provider devices 516 as input into a provider device prediction network. The mode management system 114 compares an output predicted count of provider devices with an actual count of provider devices that reflects the actual number of provider devices that traveled to the pickup location. The mode management system 114 learns parameters for the provider device prediction network by comparing the predicted count of provider devices with the actual count of provider devices. For instance, the mode management system 114 may perform a loss function and modify parameters of the provider device prediction network to reduce the loss. During application, the mode management system 114 utilizes actual data relating to the pickup location as input into the provider device prediction network. The mode management system 114 utilizes the provider device prediction network to generate the predicted count of provider devices 510.

The mode management system 114 performs the act 504 of comparing the cumulative number to the threshold number. In particular, the mode management system 114 compares the cumulative number of provider devices to a threshold number of provider devices for a given time period. In some embodiments, the mode management system 114 simply determines whether the cumulative number is less than the threshold number. For example, as illustrated in FIG. 5, the mode management system 114 compares a cumulative number of provider devices (110) with a threshold number of provider devices (200).

The mode management system 114 also performs the act 506 of determining that the cumulative number of provider devices satisfies the threshold number. In particular, the mode management system 114 determines whether, based on comparing the cumulative number of provider devices and the threshold number of provider devices, the pickup location has remaining spots to receive provider devices before reaching the threshold number of provider devices. For example, in some embodiments, the mode management system 114 determines that the cumulative number of provider devices satisfies the threshold number of provider devices when the cumulative number of provider devices is less than the threshold number of provider devices. As illustrated in FIG. 5, the mode management system 114 determines that the cumulative number of provider devices (110) is less than the threshold number of provider devices (200). Furthermore, the mode management system 114 determines that the pickup location is associated with 90 remaining spots to receive additional provider devices. In one or more other embodiments, the mode management system 114 determines that the cumulative number of provider devices satisfies the threshold number of provider devices based on determining that the number of remaining spots meets a remaining spot threshold. For instance, the mode management system 114 may determine that the cumulative number of provider devices satisfies the threshold number of provider devices based on determining that the number of remaining spots equals 15, 20, etc.

Furthermore, and as previously mentioned, the mode management system 114 may direct provider device and requestor device traffic between pickup locations by intelligently determining transportation values. FIG. 6 and the corresponding discussion provide additional detail regarding how the mode management system 114 determines a first transportation value associated with a transportation option and a second transportation value in accordance with one or more embodiments. In particular, FIG. 6 illustrates a series of acts 600 comprising an act 602 of determining a first transportation value associated with the transportation option and an act 604 of determining a second transportation value. The act 406 further comprises an act 606 of determining a second transportation value range, an act 608 of analyzing second pickup location data, and an act 610 of determining a value difference.

As illustrated in FIG. 6, the mode management system 114 performs the act 602 of determining a first transportation value associated with the transportation option. In particular, the mode management system 114 determines the first transportation value for the transportation option in a primary location transportation mode. More specifically, the mode management system 114 determines that the first transportation value is associated with a primary pickup location. The mode management system 114 may utilize various methods to determine the first transportation value associated with the transportation option. For instance, in one or more embodiments, the mode management system 114 dynamically determines the first transportation value based on various factors including the route, time of day, number of available provider devices, current demand for rides, local fees or surcharges, provider vehicle type, and other factors. In one embodiment, the mode management system 114 utilizes a heuristic model to determine the first transportation value associated with the transportation option.

As illustrated in FIG. 6, the mode management system 114 determines a first transportation value of $28 for a transportation option in a primary location transportation mode associated with a first pickup location 612. The mode management system 114 generally designates a pickup location with a high threshold (or no threshold) number of provider devices as the first pickup location 612. In some embodiments, the mode management system 114 sets the first location transportation mode associated with the first pickup location 612 as the default location transportation mode. By setting the first pickup location 612 as the default pickup location, the mode management system 114 effectively funnels the majority of provider device traffic to the first pickup location 612. In other embodiments, the mode management system 114 analyzes the past transportation request data associated with the requestor to determine pickup locations frequently selected by the requestor device. For example, based on determining that the proportion of transportation requests including a selection of a particular pickup location meets a threshold proportion, the mode management system 114 designates the particular pickup location as the default or first pickup location.

The mode management system 114 performs the act 604 of determining a second transportation value. In particular, the mode management system 114 determines a second transportation value associated with an alternate location transportation mode based on the first transportation value and the threshold number of provider devices associated with the second pickup location. In one or more embodiments, the second pickup location is associated with a lower threshold of provider devices, and the mode management system 114 determines a second transportation value that is higher than the first transportation value to limit the number of provider devices dispatched to the second pickup location. For example, as illustrated in FIG. 6, the mode management system 114 determines a second transportation value of $44 associated with the alternate location transportation mode corresponding to a second pickup location 614. More specifically, the mode management system 114 associates the second transportation value of $44, which is $24 greater than the first transportation value, with the more conveniently located second pickup location 614. The following paragraphs detail how the mode management system 114 performs the act 604 in accordance with one or more embodiments.

As illustrated in FIG. 6, the mode management system 114 performs the act 606 of determining a second transportation value range. Generally, the mode management system 114 determines a transportation value range for the second transportation value. In one embodiment, the mode management system 114 sets the first transportation value as the second transportation value minimum to ensure that the second transportation value does not fall below the first transportation value. For example, as illustrated in FIG. 6, the mode management system 114 sets the first transportation value of $28 as the second transportation value minimum. In one or more embodiments, the mode management system 114 determines a buffer between the first transportation value and the second transportation value minimum. For example, the mode management system 114 can set $29, with a $1 buffer, as the second transportation value minimum. The mode management system 114 also determines a second transportation value maximum. In one embodiment, the mode management system 114 utilizes a predetermined maximum difference between the second transportation value minimum and the second transportation value maximum. For example, and as illustrated, the mode management system 114 can determine that a maximum difference comprises $20. In other embodiments, the mode management system 114 analyzes transportation values associated with other transportation options to determine a second value limit (e.g., $48) and/or a maximum difference ($20). FIG. 7 illustrates how the mode management system 114 utilizes various other transportation values to determine the second transportation value range in accordance with one or more embodiments.

As further illustrated in FIG. 6, the mode management system 114 performs the act 608 of analyzing second pickup location data. In particular, the second pickup location data comprises a cumulative number of provider devices 618 and a threshold number of provider devices 620. Generally, the closer the cumulative number of provider devices 618 is to the threshold number of provider devices 620, the mode management system 114 will set higher second transportation values as to decrease the number of requestor devices that select the second location transportation mode. As mentioned previously, the cumulative number of provider devices 618 comprises a current count of provider devices or a predicted count of provider devices. In one or more embodiments, the mode management system 114 utilizes a combination of the current count of provider devices and a predicted count of provider devices to determine the second transportation value.

Additionally, or alternatively, as part of the act 608 of analyzing second pickup location data comprises analyzing the demand from requestor devices for pickup at the second pickup location. Generally, the mode management system 114 monitors real time data comprising the number of requestor devices that have selected the alternate location transportation mode within a given time period. In one embodiment, based on a greater demand for pickup at the second pickup location, the mode management system 114 increases the second transportation value to lower the demand. For example, on determining that the number of requestor devices selecting the alternate location transportation mode meets a threshold requestor device number, the mode management system 114 increases the second transportation value.

The mode management system 114 performs the act 610 of determining a value difference. In particular, the mode management system 114 determines a value difference between the second transportation value and the first transportation value. The mode management system 114 determines the value difference based on the analysis of the second pickup location data. In one example, the mode management system 114 determines what percentage of the threshold number of provider device has been utilized based on the cumulative number of provider devices 618. For example, the mode management system 114 can determine that the cumulative number of provider devices equals 20% of the threshold number of provider devices in a given time period. Based on this determination, the mode management system 114 further determines 20% of the maximum difference determined above in the act 606. The mode management system 114 designates the percentage of the maximum difference as the value difference. For example, and as illustrated in FIG. 6, the mode management system 114 determines that 20% of the maximum difference ($20) equals $4. Thus, the mode management system 114 adds $4 to the first transportation value ($28) to determine the second transportation value.

As illustrated in FIG. 6, the smaller the difference between the cumulative number of provider devices and the threshold number of provider devices, the greater the value difference. For example, the mode management system 114 may also determine that the cumulative number of provider devices comprises 80% of the threshold number of provider devices. The mode management system 114 then determines 80% of the maximum difference ($20) to be $16. The mode management system 114 adds the value difference of $16 to the first transportation value to determine the second transportation value.

The mode management system 114 may utilize additional or alternative methods to determine the value difference based on analyzing the second pickup location data. For example, the mode management system 114 can associate each of a set of pre-determined value differences (e.g., $4, $10, $16) with a range of threshold number of provider device percentages. For instance, the mode management system 114 can determine that when the cumulative number of provider devices comprises anywhere from 0-25% of the threshold number of provider devices, the mode management system 114 assigns a $4 value difference in calculating the second transportation value. When the cumulative number of provider devices equals 26%-50% of the threshold number of provider devices, the mode management system 114 determines a $10 value difference for the second transportation value.

As mentioned, in one or more embodiments, the mode management system 114 determines a second transportation value range as part of determining the second transportation value. FIG. 7 illustrates the mode management system 114 determining a second transportation value range based on transportation values associated with various transportation options in accordance with one or more embodiments.

As illustrated in FIG. 7, the mode management system 114 identifies transportation options 702. Each of the transportation options may be associated with a location transportation mode of the location transportation modes 704. For instance, the shared transportation option can be associated with a first location transportation mode corresponding to a first pickup location or an alternate location transportation mode corresponding to a second pickup location.

As further illustrated in FIG. 7, and as mentioned previously, the mode management system 114 determines first transportation values 706 associated with the transportation options 702. More specifically, in some embodiments, the mode management system 114 determines the first transportation values 706 associated with the transportation options 702 in the first location transportation mode. The mode management system 114 determines the first transportation values 706 as described previously with respect to the act 602 illustrated in FIG. 6. As mentioned previously, the mode management system 114 may set the first transportation values 706, or the first transportation values 706 with a buffer, as the second transportation value minimums.

As illustrated in FIG. 7, as part of determining the second transportation value range, the mode management system 114 determines second transportation value maximums 708. As mentioned previously, the mode management system 114 may determine the second transportation value maximums 708 by adding a predetermined maximum difference to the second transportation value minimums. In yet other embodiments, the mode management system 114 ensures that transportation values associated with a transportation option do not overlap with transportation values associated with other transportation options. Thus, in some embodiments, the mode management system 114 designates the first transportation values associated with other transportation options as the second transportation value maximums 708. In particular, the mode management system 114 identifies the first transportation value associated with another transportation option that is closest in value to the first transport associated with a given transportation option.

To illustrate, the mode management system 114 determines that the first transportation value associated with the classic transportation option ($28) is closest, in value, to the first transportation value of the shared transportation option ($20). Based on this determination, the mode management system 114 determines that the second transportation value maximum for the shared transportation option comprises $28. In one or more embodiments, the mode management system 114 determines a second transportation value maximum by subtracting a buffer value from the closest first transportation value. For example, the mode management system 114 may determine that the second transportation value maximum for the shared transportation value equals $27 or $27.50.

Figure 8D:
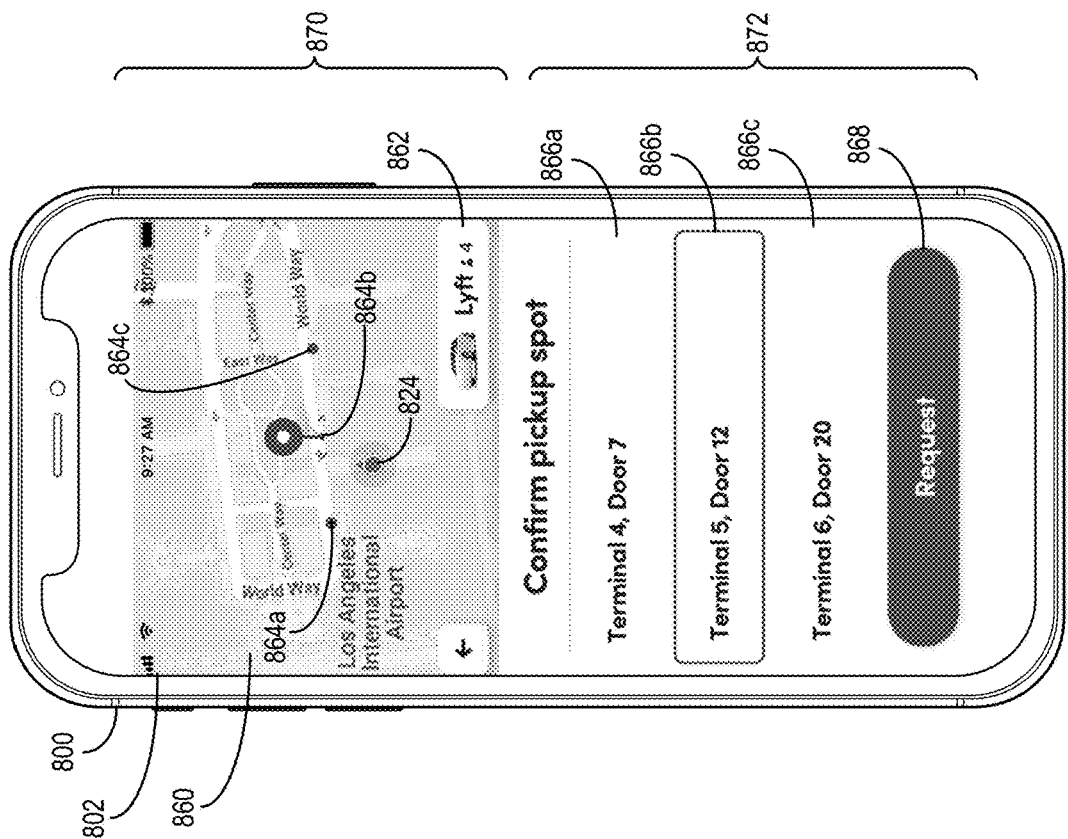
Figure 8C:
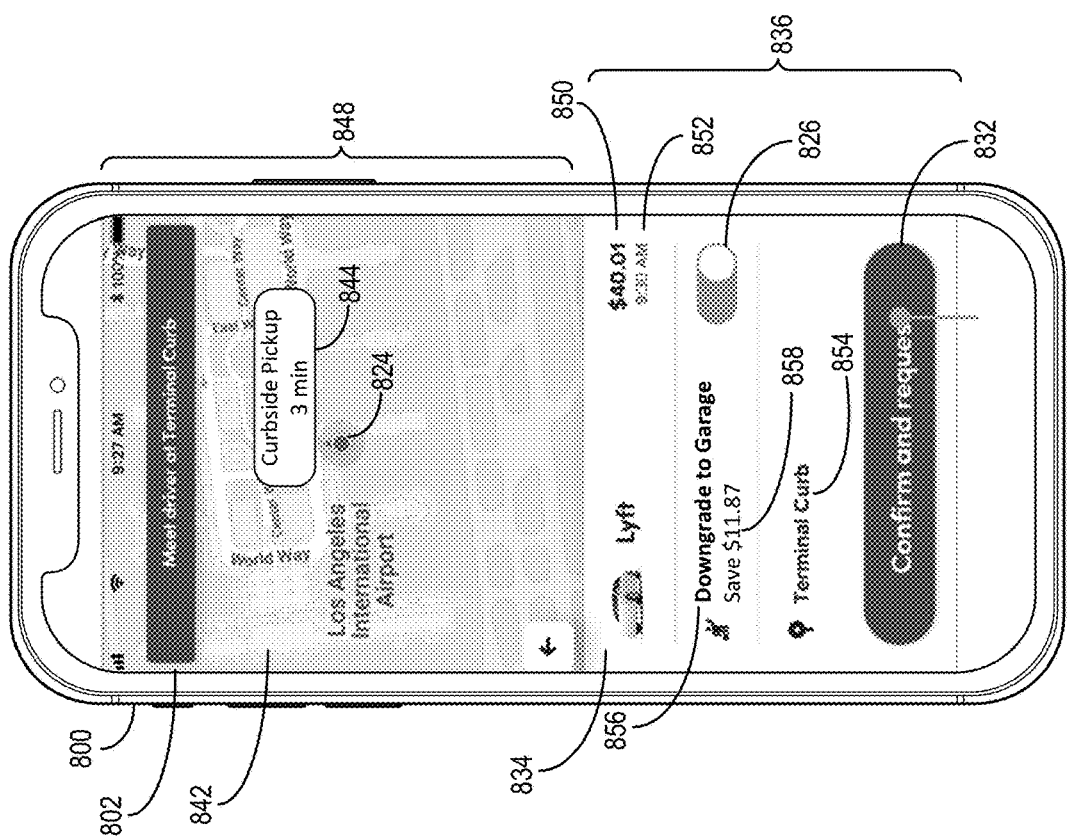
Figure 8E:
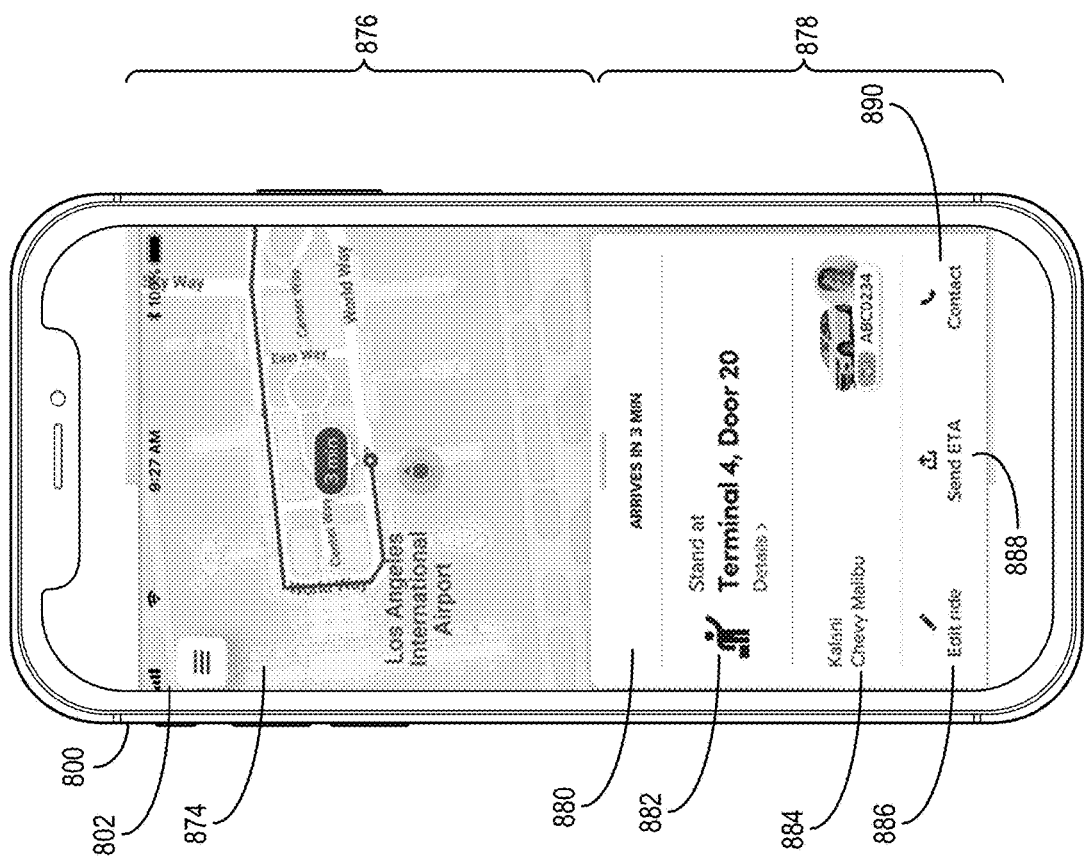

As mentioned previously, the mode management system 114 can provide a series of graphical user interfaces for display at a requestor device. FIGS. 8A-8E provide examples of various graphical user interfaces generated and transmitted by the mode management system 114 in accordance with one or more embodiments. In particular, FIG. 8A illustrates an example transportation option user interface by which the mode management system 114 receives a selection of a particular transportation option. FIGS. 8B-8C illustrate an example series of mode selection user interfaces by which the mode management system 114 receives a selection of a particular location transportation mode. FIG. 8D illustrates a pickup location confirmation user interface, and FIG. 8E illustrates a request summary user interface in accordance with one or more embodiments. The following paragraphs describe each of these figures in additional detail.

FIG. 8A illustrates a transportation option user interface 804 displayed via a screen 802 of a client device 800. Generally, the mode management system 114 provides, via the transportation option user interface 804, one or more transportation options. In particular, the transportation option user interface 804 includes a map element 806 as well as a transportation options element 808 comprising transportation options 812a-812c.

As illustrated in FIG. 8A, the transportation option user interface 804 includes one or more transportation options corresponding to a first pickup location of a multi-pickup-location area. In particular, the transportation option user interface 804 includes the transportation options 812a-812c. The transportation options 812a-812c are each associated with a transportation value or a range of transportation values. For instance, the transportation option 812a is associated with a transportation value range of $24-41, and the transportation option 812c is associated with a transportation value range of $48-55. The transportation value range may comprise a preview of the first transportation value compared with a second transportation value associated with an alternate location transportation mode and a corresponding second pickup location. For example, the transportation option 812a associated with a first transportation location corresponds to the transportation value $28, and the transportation option 812a associated with the second transportation location corresponds to the transportation value $41.

In some embodiments, and as illustrated in FIG. 8A, the mode management system 114 only associates certain transportation options with an alternate location transportation mode. In other words, some transportation options are associated with a single pickup location. For example, the transportation option 812b for a shared ride is associated with a single location transportation mode corresponding to a single pickup location. The mode management system 114 provides, via the transportation option user interface 804, which transportation options are available in alternate location transportation modes. For instance, as illustrated in FIG. 8A, the transportation options 812a and 812c include a "Curbside available" indicator reflecting that an alternate location transportation mode corresponding to a second pickup location (i.e., a curbside spot) is available.

As further illustrated in FIG. 8A, the transportation options element 808 also includes time elements 809a-809c associated with each of the transportation options 812a-812c. The time elements 809a-809c may indicate anticipated pickup times and/or dropoff times corresponding to the transportation options 812a-812c. In particular, in at least one embodiment, the time elements 809a-809c indicate predicted times associated with the transportation options 812a-812c in a first location transportation mode corresponding to a first pickup location. For example, the time elements 809a-809c reflect pickup and/or dropoff times associated with the transportation options 812a-812c when the provider devices pick up the requestor device at a first pickup location (e.g., a garage pickup spot).

The map element 806 generally indicates various devices and locations associated with a transportation request overlayed on a map. The map element 806 includes a first pickup location indicator 814 that reflects the identity of and the location of the first pickup location. For example, the first pickup location indicator 814 indicates that the first pickup location comprises a garage pickup. In some embodiments, the first pickup location indicator 814 also includes a time element that reflects the amount of time required for the requestor device to travel to the first pickup location and/or the amount of time required for a provider device to travel to the first pickup location. Furthermore, the map element 806 includes provider device indicators that reflect the locations of various provider devices. For example, the provider device indicators comprise icons of cars in proximity to the first pickup location.

The map element 806 reflects the locations of provider devices based on a selected transportation option of the transportation options 812a-812c. In particular, and as illustrated in FIG. 8A, the client device 800 highlights the transportation option 812a either by default or based on a requestor selection of the transportation option 812a. Accordingly, the mode management system 114 provides, via the map element 806, the provider device indicators corresponding to provider devices of the type indicated by the transportation option 812a. Additionally, based on selection of the transportation option 812c, the client device 800 can update the map element 806 to display the locations of Lyft XL provider devices.

The mode management system 114 can provide, for display via a graphical user interface, various location transportation modes associated with a selected transportation option. The mode management system 114 can determine a selected transportation option based on user selection of a transportation option selection element 810. For example, the mode management system 114 can receive a selection of one of the transportation options 812a-812c followed by a selection of the transportation option selection element 810.

Based on selection of a transportation option, the mode management system 114 can provide a mode selection user interface for display via a graphical user interface. FIG. 8B illustrates an example mode selection user interface for providing a selectable mode option in accordance with one or more embodiments. In particular, FIG. 8B illustrates a mode selection user interface 820 presented via the screen 802 of the client device 800. The mode selection user interface 820 includes a map element 818 and a mode selector element 836. The mode selector element 836 includes a selectable mode option 826.

As illustrated in FIG. 8B, the mode selection user interface 820 includes the map element 818. The map element 818 indicates locations of the requestor device and a first pickup location. For example, the map element 818 includes a first pickup location indicator 822. As illustrated, the first pickup location indicator 822 reflects both the geographic location of and an identifier ("Garage Pickup") associated with the first pickup location. In some embodiments, the first pickup location indicator 822 also indicates the amount of time required for a provider device to arrive at the first pickup location and/or the time required for the requestor device to travel to the first pickup location. For example, as illustrated in FIG. 8B, the first pickup location indicator 822 indicates that a provider device can arrive at the first pickup location in 8 minutes. Furthermore, the map element 818 indicates an approximate distance from the requestor device. In particular, the map element 818 includes a requestor device location indicator 824. In some embodiments, the map element 818 includes a predicted route element 816 that indicates a predicted route that the requestor device can travel to the first pickup location.

Generally, the mode selector element 836 illustrated in FIG. 8B provides data relevant to a transportation option in a first location transportation mode as well as a selectable mode option for initiating alternative location transportation modes. In particular, the mode selector element 836 includes a transportation option 834. The transportation option 834 indicates the type of vehicle associated with the transportation request. The mode selector element 836 also includes a first pickup location element 830 to indicate the pickup location associated with the currently viewed location transportation mode. Furthermore, the transportation option 834 includes information corresponding to the first location transportation mode. For example, the transportation option 834 includes a first transportation value 838 and a first time element 840. The first transportation value 838 indicates the transportation value associated with the transportation option 834 associated with the first location transportation mode corresponding to the first pickup location. The first time element 840 indicates a time relevant to the transportation option 834. For example, and as illustrated, the first time element 840 comprises an anticipated time at which a provider device will arrive at the first pickup location. In other embodiments, the first time element 840 comprises an anticipated dropoff time when the provider device will deliver the provider device to the destination location.

As further illustrated in FIG. 8B, the mode selector element 836 includes the selectable mode option 826. Generally, the selectable mode option 826 comprises any type of user interface element that initiates an alternate location transportation mode. In particular, based on user interaction with the selectable mode option 826, the mode management system 114 initiates an alternate location transportation mode by changing the first pickup location to a second pickup location. For example, and as illustrated, the selectable mode option 826 comprises a toggle element. While FIG. 8B illustrates a single alternate location transportation option, the mode management system 114 may provide additional alternate location transportation options. For example, in one or more other embodiments, the selectable mode option 826 comprises two or more toggle elements—each associated with a different alternate location transportation option. In yet other embodiments, the selectable mode option 826 comprises a list of two or more alternate location transportation options.

Additionally, the mode selector element 836 includes details relevant to an alternate location transportation mode associated with a second pickup location. In particular, the mode selector element 836 includes a second pickup location prompt 827 as well as a value difference element 828. The second pickup location prompt 827 includes an indicator for the second pickup location associated with the alternate location transportation mode. For example, the second pickup location prompt 827 indicates that the second pickup location comprises a curbside spot. The value difference element 828 indicates a value difference between the first location transportation mode and the alternate location transportation mode. For example, the value difference element 828 indicates that the alternate location transportation mode is associated with a second transportation value that is $11.87 greater than the first transportation value.

The mode management system 114 may dispatch a provider device to the pickup location indicated via the mode selection user interface 820 based on user interaction with a location transportation mode confirmation element 832. As mentioned previously, the mode management system 114 identifies a provider device and sends relevant transportation request data to the identified provider device. As illustrated in FIG. 8B, based on user selection of the location transportation mode confirmation element 832, the mode management system 114 dispatches a provider device to the first pickup location, i.e., the parking garage.

As mentioned, the mode management system 114 may provide details relating to one or more alternate location transportation modes via the mode selection user interface. In particular, based on user interaction with the selectable mode option 826 of FIG. 8B, the mode management system 114 initiates an alternate location transportation mode. In particular, the mode management system 114 modifies the pickup location from the first pickup location to the second pickup location. FIG. 8C illustrates an example mode selection user interface displaying details relating to a second pickup location corresponding to the alternate location transportation mode in accordance with one or more embodiments. In particular, FIG. 8C illustrates a mode selection user interface 842 presented via the screen 802 of the client device 800. The mode management system 114 provides updated transportation details based on the initiation of the alternate location transportation mode. For example, the mode selection user interface 842 includes a map element 848 comprising a second pickup location indicator 844 and the requestor device location indicator 824. Additionally, the mode selection user interface 842 updates information displayed via the mode selector element 836 to reflect the modified pickup location.

As illustrated in FIG. 8C, the mode management system 114 updates the map element 848 to indicate the geographic location of the second pickup location. In particular, the map element 848 includes the second pickup location indicator 844 and the requestor device location indicator 824. The second pickup location indicator 844 reflects both the identity of and geographic location of the second pickup location. In particular, the second pickup location indicator 844 corresponds to a second pickup location element 854 displayed via the mode selector element 836. As illustrated, the second pickup location is closer in proximity to the location of the requestor device than was the first pickup location. In some embodiments, the second pickup location indicator 844 also includes a time element indicating the amount of time required for the requestor device to travel to the second pickup location. Additionally, or alternatively, the time element indicates the amount of time required for a provider device to arrive at the second pickup location.

As mentioned, the mode selector element 836 provides additional detail relating to the displayed pickup location. In particular, the mode selector element 836 includes the transportation option 834, a second transportation value 850, and a second time element 852. The transportation option 834 indicates the selected transportation option. In particular, the transportation option 834 remains the same as in the first location transportation mode even as the mode management system 114 initiates an alternative location transportation mode. The second transportation value 850 comprises a transportation value associated with the alternate location transportation mode. Additionally, the second time element 852 indicates a time associated with the alternate location transportation mode. For example, as illustrated in FIG. 8C, the second time element 852 can comprise a pickup time associated with the alternate location transportation mode. Additionally, or alternatively, the second time element 852 can comprise a dropoff time associated with the alternate location transportation mode.

Additionally, and as illustrated in FIG. 8C, the mode selector element 836 includes a first pickup location prompt 856 and a value difference element 858 together with the selectable mode option 826. Based on user interaction with the selectable mode option 826, the mode management system 114 initiates the first location transportation mode corresponding to the first pickup location. In particular, the mode management system 114 indicates, via the first pickup location prompt 856, which location transportation mode the mode management system 114 will initiate upon selection of the selectable mode option 826. As illustrated in FIG. 8C, the mode management system 114 indicates that the mode management system 114 will initiate the first location transportation mode associated with the first pickup location (i.e., "Garage") based on selection of the selectable mode option 826. Furthermore, the mode management system 114 provides the value difference element 858 to indicate the value difference between the first transportation value and the second transportation value. For example, the value difference element 858 indicates that the first transportation value is $11.87 less than the second transportation value.

In some embodiments, the mode management system 114 provides additional detail within the mode selector element 836 illustrated in FIGS. 8B and 8C. In particular, in some embodiments, the mode management system 114 provides an estimated travel time to the pickup location. For example, the mode management system 114 can provide, together with the value difference element 858 (and/or the value difference element 828 of FIG. 8B), a travel time difference element indicating a difference in travel time to the first pickup location and the second pickup location. Additionally, the mode management system 114 can provide details regarding a route to each of the pickup locations. For instance, the mode management system 114 might indicate whether the requestor associated with the requestor device needs to walk, take a shuttle, take a rideshare scooter or bicycle, or other means of transportation to the identified pickup location.

In some embodiments, a pickup location comprises a single place where a provider device can meet a requestor device. In such embodiments, the mode management system 114 dispatches a provider device to the selected pickup location based on user interaction with the location transportation mode confirmation element 832. In one or more embodiments, the mode management system 114 associates two or more meeting points with a single pickup location. For example, the curbside pickup location of an airport might include several meeting points corresponding with different doors and/or terminals of the airport. In another example, the curbside pickup location of a large venue might include several entrances or exits of the venue. FIG. 8D illustrates an example meeting point selection user interface for presenting and receiving a selection of a meeting point associated with a pickup location in accordance with one or more embodiments. In particular, FIG. 8D illustrates a meeting point selection user interface 860 including a map element 870 and a meeting point selection element 872. The meeting point selection element 872 displays meeting point location elements 866a-866c, and the map element 870 indicates the geographic locations of the meeting points via meeting point location indicators 864a-864c.

As illustrated in FIG. 8D, the mode management system 114 provides, via the meeting point selection user interface 860, the map element 870. Generally, the map element 870 displays the geographic location of the requestor device in relation to potential meeting points. In particular, the map element 870 includes the meeting point location indicators 864a-864c. Each of the meeting point indicators correspond to one of the meeting point location elements 866a-866c listed within the meeting point selection element 872.

In some embodiments, the mode management system 114 highlights one of the meeting point location indicators 864a-864c based on user interaction with the corresponding one of the meeting point location elements 866a-886c. For example, and as illustrated in FIG. 8D, the mode management system 114 highlights the meeting point location indicator 864b by adding a pin icon to the meeting point location indicator 864b. The mode management system 114 highlights the meeting point location indicator 864b based on user interaction with the corresponding meeting point location element 866b.

In some embodiments, the meeting point location indicators 864a-864c comprise interactive user interface elements. For example, based on receiving a user interaction with the meeting point location indicators 864a-864c, the client device 800 can update the graphical user interface to highlight the corresponding meeting point location element of the meeting point location elements 866a-866c.

As further illustrated in FIG. 8D, the meeting point selection user interface 860 includes a transportation option indicator 862. Generally, the transportation option indicator 862 displays information indicating the selected transportation option. For example, the transportation option indicator 862 shows that the selected transportation option is associated with a sedan provider vehicle and can seat four passengers.

Additionally, as illustrated in FIG. 8D, the meeting point selection user interface 860 includes a meeting point selection element 868. Based on user interaction with the meeting point selection element 868, the mode management system 114 confirms selection of the selected and highlighted meeting point element. The mode management system 114 also dispatches a provider device to the selected meeting point.

The mode management system 114 dispatches a provider device to a determined pickup location and/or meeting point. In some embodiments, the mode management system 114 provides a transportation request summary user interface for display via a graphical user interface. FIG. 8E illustrates an example transportation request summary user interface in accordance with one or more embodiments. In particular, FIG. 8E illustrates a transportation request summary user interface 874 displayed via the screen 802 of the client device 800. The transportation request summary user interface 874 includes a map element 876 and a transportation request information element 878.

Generally, the transportation request information element 878 displays information relevant to the ride request. In particular, and as illustrated in FIG. 8E, the transportation request information element 878 includes a provider device arrival element 880, a pickup location indicator 882, and a provider device identification element 884. The provider device arrival element 880 indicates the time until the provider device will arrive at the pickup location. The pickup location indicator 882 provides information relating to the pickup location. For example, the pickup location indicator 882 includes identifying information such as location labels or titles of the pickup location. The provider device identification element 884 includes information that identifies the provider device, the provider vehicle, and/or the associated provider. For example, and as illustrated, the provider device identification element 884 includes the provider name, the make and model of the provider vehicle, images of the provider and the provider vehicle, and license plate number.

Additionally, the transportation request information element 878 includes elements for performing various actions with respect to the transportation request. As illustrated in FIG. 8E, the transportation request information element 878 includes an edit ride element 886, a send ETA element 888, and a contact provider device element 890. Based on user interaction with the edit ride element 886, the mode management system 114 can modify the transportation request. For example, the mode management system 114 can provide additional user interface elements and features for modifying the pickup location, the type of vehicle, and other characteristics corresponding to the transportation request. Based on user interaction with the send ETA element 888, the mode management system 114 sends, to a contact of the requestor device, an estimated time of arrival to the destination location. Additionally, based on user interaction with the contact provider device element 890, the mode management system 114 initiates contact between the provider device and the requestor device. For example, the mode management system 114 may initiate a phone conversation, a text messaging conversation, or another type of electronic communication.

Figure 9:
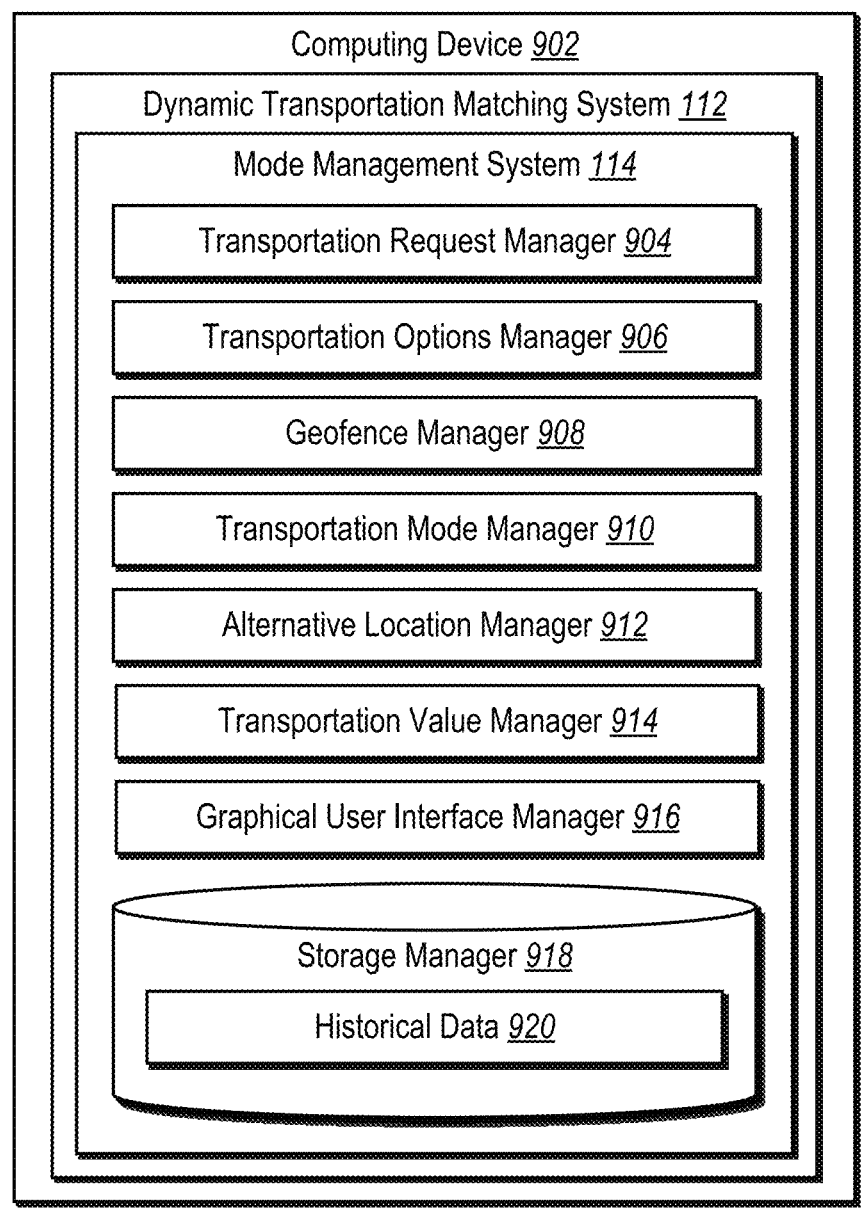
FIG. 9 illustrates a block diagram of an example computing device in accordance with one or more embodiments of the present disclosure.

FIGS. 1-8A, the corresponding text, and the examples provide several different systems, methods, techniques, components, and/or devices of the mode management system 114 in accordance with one or more embodiments. FIG. 9 and the corresponding discussion provide additional detail regarding components and capabilities of the mode management system 114. Specifically, FIG. 9 illustrates an example schematic diagram 900 of the mode management system 114 implemented within the dynamic transportation matching system 112 on an example computing device 902 (e.g., one or more of the server(s) 110, the requestor device 116, and/or the provider device 102). As shown in FIG. 9, the mode management system 114 includes a transportation request manager 904, a transportation options manager 906, a geofence manager 908, a transportation mode manager 910, an alternative location manager 912, a transportation value manager 914, a graphical user interface manager 916, and a storage manager 918.

The mode management system 114 illustrated in FIG. 9 includes the transportation request manager 904. The transportation request manager 904 generates, manages, and stores transportation requests received from requestor devices. In particular, the transportation request manager 904 compiles data including a requested pickup location, a meeting point, a selected transportation option, a destination location, and other relevant information within a transportation request. Additionally, the transportation request manager 904 sends generated transportation requests to selected provider devices. Furthermore, the mode management system 114 can store information regarding matched requestor devices and provider devices.

As further illustrated in FIG. 9, the mode management system 114 includes the transportation options manager 906. The transportation options manager 906 generates, manages, stores, and provides data associated with various transportation options associated with a transportation request. In particular, the transportation options manager generates transportation options by associating various types of transportation vehicles (e.g., sedan, SUV, etc.) or request types (e.g., private, shared, etc.) with transportation requests. Furthermore, the mode management system 114 can associate transportation requests with a first pickup location.

The mode management system 114 illustrated in FIG. 9 also includes the geofence manager 908. The geofence manager 908 creates, manages, and stores geofences associated with multi-pickup-location areas. In particular, the geofence manager 908 can define the boundaries of a geofence based on determined coordinates of a multi-pickup-location area. Furthermore, the geofence manager 908 determines whether a requestor device is within the boundaries of a particular geofence. More specifically, the geofence manager 908 compares the location of a requestor device with coordinates of a determined geofence.

As further illustrated in FIG. 9, the mode management system 114 includes the transportation mode manager 910. The transportation mode manager 910 generates, manages, and stores various location transportation modes that are associated with different pickup locations. In particular the transportation mode manager 910 generates location transportation modes for each pickup location within a multi-pickup-location area. Furthermore, the transportation mode manager 910 stores associates between pickup locations and location transportation modes.

As illustrated in FIG. 9, the mode management system 114 also includes the alternative location manager 912. Generally, the alternative location manager 912 identifies a primary pickup location and one or more alternative pickup locations within a multi-pickup-location area. In particular, the alternative location manager 912 determines the coordinates of pickup locations. Furthermore, the alternative location manager 912 associates threshold numbers of provider devices with alternative pickup locations and/or the primary pickup location.

The mode management system 114 includes the transportation value manager 914. Generally, the transportation value manager 914 generates, manages, and stores transportation values associated with various location transportation modes corresponding to different pickup locations. In particular, the transportation value manager 914 generates a first transportation value associated with a transportation option corresponding to a first pickup location and a second transportation value associated with an alternate location transportation mode.

As illustrated in FIG. 9, the mode management system 114 also includes the graphical user interface manager 916. The graphical user interface manager 916 generates and provides graphical user interfaces, elements, and features for display at a client device. For instance, the graphical user interface manager 916 can present user interfaces including a transportation option user interface displaying one or more transportation options, a mode selection user interface for providing a selectable mode option, and additional graphical user interfaces described herein. Additionally, the graphical user interface manager 916 receives instructions or communications from client devices to perform available actions. For instance, the graphical user interface manager 916 may receive a selection of a transportation option and/or interaction with the selectable mode option and communicate the selection with other components of the mode management system 114.

As further illustrated in FIG. 9, the mode management system 114 includes the storage manager 918. The storage manager 918 stores information utilized by the mode management system 114. For instance, the mode management system 114 may store historical data 920. In particular, the historical data 920 includes historical provider device data corresponding to a multi-pickup-location area. For example, the historical data 920 can include historical provider device data that the mode management system 114 utilizes to predict a cumulative number of provider devices that will be dispatched to a pickup location within a given time period.

The components of the mode management system 114 can include software, hardware, or both. For example, the components of the mode management system 114 can include one or more instructions stored on a computer-readable storage medium and executable by processors of one or more computing devices (e.g., the computing device 902). When executed by the one or more processors, the computer-executable instructions of the mode management system 114 can cause the computing device 902 to perform the methods described herein. Alternatively, the components of the mode management system 114 can comprise hardware, such as a special purpose processing device to perform a certain function or group of functions. Additionally, or alternatively, the components of the mode management system 114 can include a combination of computer-executable instructions and hardware.

Furthermore, the components of the mode management system 114 performing the functions described herein may, for example, be implemented as part of a stand-alone application, as a module of an application, as a plug-in for applications including content management applications, as a library function or functions that may be called by other applications, and/or as a cloud-computing model. Thus, the components of the mode management system 114 may be implemented as part of a stand-alone application on a personal computing device or a mobile device. Alternatively, or additionally, the components of the mode management system 114 may be implemented in any application that allows creation and delivery of marketing content to users, including, but not limited to, various applications.

Figure 10:
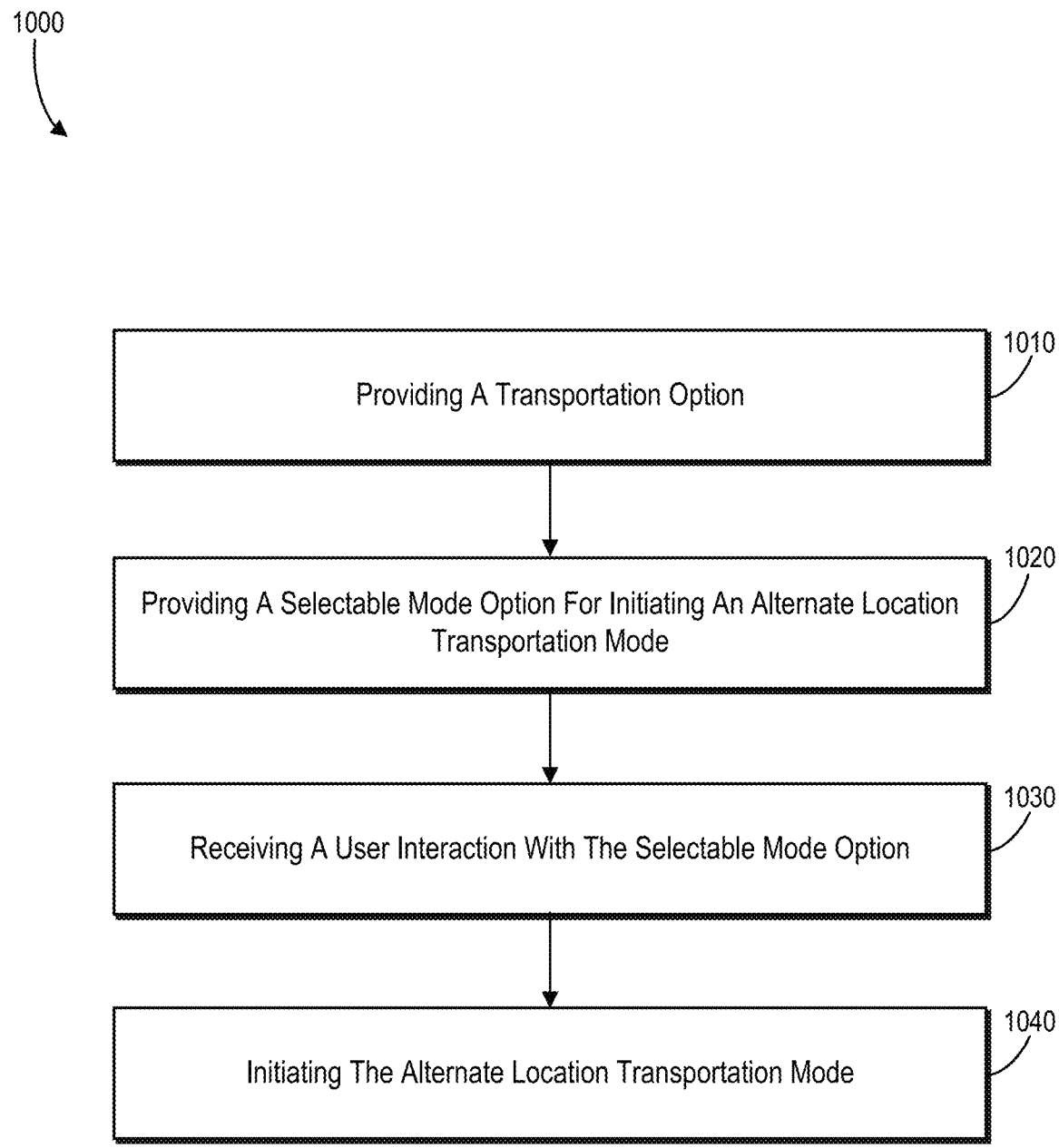
FIG. 10 illustrates a series of acts for initiating an alternate location transportation mode in accordance with one or more embodiments of the present disclosure.

In addition to the above descriptions, one or more embodiments can also be described in terms of flowcharts including acts for accomplishing a particular result. For example, FIG. 10 illustrates a flowchart of an example sequence of acts in accordance with one or more embodiments. In addition, the acts illustrated in FIG. 10 may be performed with more or fewer acts. Further, the acts may be performed in different orders. The acts described herein may be repeated or performed in parallel with one another or in parallel with different instances of the same or similar acts. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system comprising one or more memory devices and one or more server devices can perform the acts of FIG. 10.

To illustrate, FIG. 10 includes a flowchart of a series of acts 1000 of initiating an alternate location transportation mode. As shown, the series of acts 1000 includes an act 1010 of providing a transportation option, an act 1020 of providing a selectable mode option for initiating an alternate location transportation mode, an act 1030 of receiving a user interaction with the selectable mode option, and an act 1040 of initiating the alternate location transportation mode.

The series of acts 1000 includes the act 1010 of providing a transportation option. In particular, the act 1010 comprises providing, for display, via a graphical user interface of a requestor device, a transportation option corresponding to a first pickup location.

As illustrated in FIG. 10, the series of acts 1000 includes the act 1020 of providing a selectable mode option for initiating an alternate location transportation mode. In particular, the act 1020 comprises, in response to determining that the requestor device is associated with a location within a geofence corresponding to a multi-pickup-location area, providing, for display via the graphical user interface of the requestor device, a selectable mode option for initiating an alternate location transportation mode corresponding to the multi-pickup-location area. In one or more embodiments, the act 1020 further comprise the act of providing the selectable mode option by: comparing a cumulative number of provider devices associated with the second pickup location over a time period with the threshold number of provider devices; and determining that the cumulative number of provider devices satisfies the threshold number of provider devices. In at least one embodiment, the alternate location transportation mode is not available to requestor devices located outside of the geofence corresponding to the multi-pickup-location area.

The series of acts 1000 includes the act 1030 of receiving a user interaction with the selectable mode option. In particular, the act 1030 comprises receiving, from the requestor device, a user interaction with the selectable mode option.

The series of acts 1000 includes the act 1040 of initiating the alternate location transportation mode. In particular, the act 1040 comprises initiating the alternate location transportation mode by modifying the first pickup location to a second pickup location within the multi-pickup-location area and providing the second pickup location for display via the graphical user interface.

In some embodiments, the series of acts 1000 comprises the additional act of providing, for display via the graphical user interface, and together with the transportation option, a second transportation option corresponding to the first pickup location.

Additionally, in one or more embodiments, the series of acts 1000 comprises the additional acts of identifying a threshold number of provider devices associated with the second pickup location; and providing the selectable mode option based on the threshold number of provider devices.

The series of acts 1000 may further comprise the act of dispatching a provider device to the second pickup location within the multi-pickup-location area.

In one or more embodiments, the series of acts 1000 further comprises the act of providing, for display, a map element together with the transportation option corresponding to the first pickup location and the selectable mode option for initiating the alternate location transportation mode, the map element comprising an indicator representative of the first pickup location. This additional act may further comprise providing the second pickup location for display by updating the map element to comprise an indicator representative of the second pickup location.

The series of acts 1000 can further include the acts of determining a first transportation value associated with the transportation option; and providing the transportation option corresponding to the first pickup location by providing, for display via the graphical user interface, the first transportation value associated with the transportation option. Furthermore, the additional acts can further comprise determining a second transportation value associated with the alternate location transportation mode based on the first transportation value and the threshold number of provider devices associated with the second pickup location within the multi-pickup-location area; and providing the selectable mode option by providing, for display via the graphical user interface, an indication of the second transportation value associated with the alternate location transportation mode.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
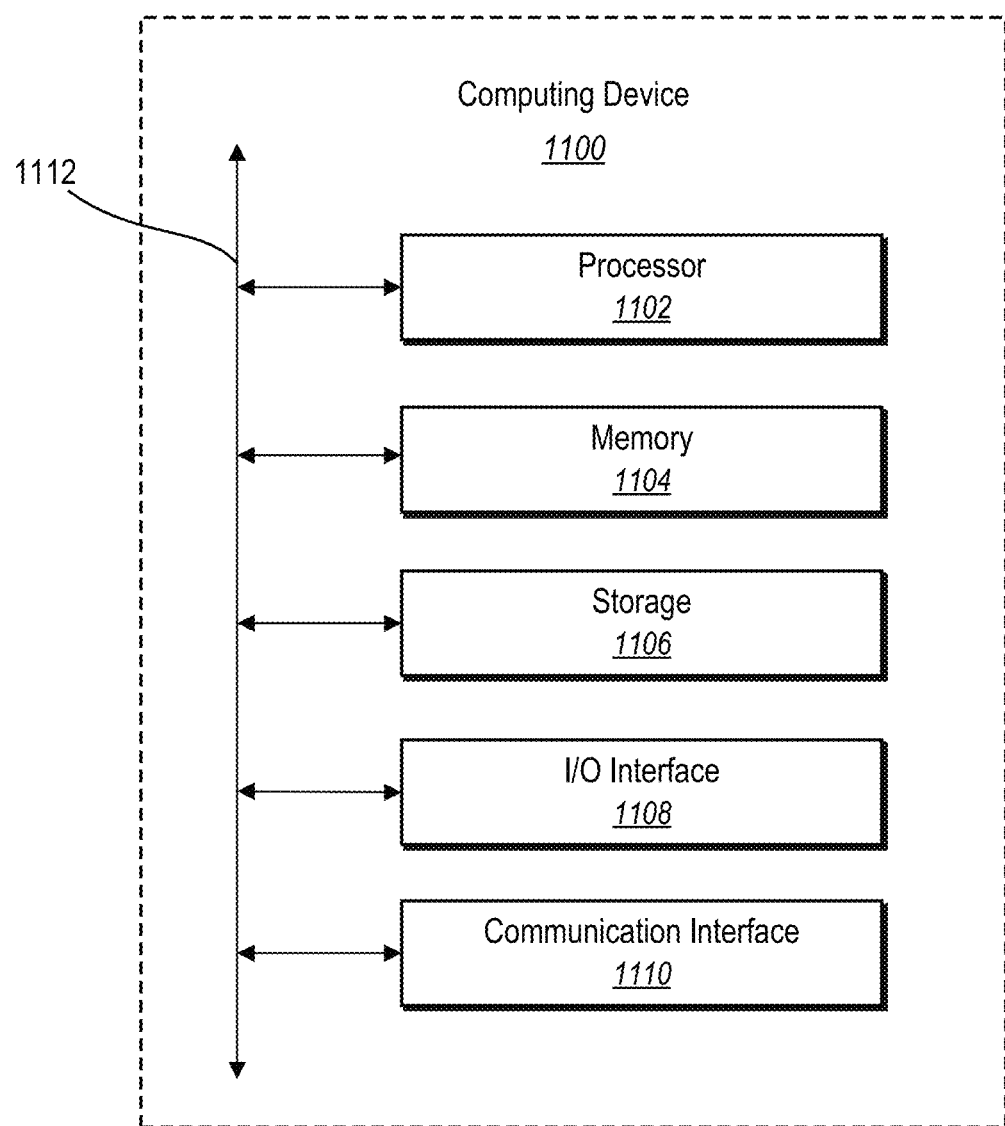
FIG. 11 illustrates a block diagram of an example computing device in accordance with one or more embodiments of the present disclosure.

FIG. 11 illustrates, in block diagram form, an exemplary computing device 1100 (e.g., the computing device 902, the server(s) 110, the provider device 102, and/or the requestor device 116) that may be configured to perform one or more of the processes described above. One will appreciate that the mode management system 114 can comprise implementations of the computing device 1100, including, but not limited to, the requestor device 116, the provider device 102, and/or the server(s) 110. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, the processor 1102 includes hardware for executing instructions, such as those making up a computer program. As an example, and not by way of limitation, to execute instructions, the processor 1102 may retrieve (or fetch) the instructions from an internal register, an internal cache, memory 1104, or a storage device 1106 and decode and execute them.

The computing device 1100 includes memory 1104, which is coupled to the processor 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive ("HDD"), flash memory, a Universal Serial Bus ("USB") drive or a combination of these or other storage devices.

The computing device 1100 also includes one or more input or output interface 1108 (or "I/O interface 1108"), which are provided to allow a user (e.g., requester or provider) to provide input to (such as user strokes), receive output from, and otherwise transfer data to and from the computing device 1100. The I/O interface 1108 may include a mouse, keypad or a keyboard, a touch screen, camera, optical scanner, network interface, modem, other known I/O devices or a combination of such. The touch screen may be activated with a stylus or a finger.

The I/O interface 1108 may include one or more devices for presenting output to a user, including, but not limited to, a graphics engine, a display (e.g., a display screen), one or more output providers (e.g., display providers), one or more audio speakers, and one or more audio providers. In certain embodiments, interface 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include a bus 1112. The bus 1112 can comprise hardware, software, or both that connects components of computing device 1100 to each other.

Figure 12:
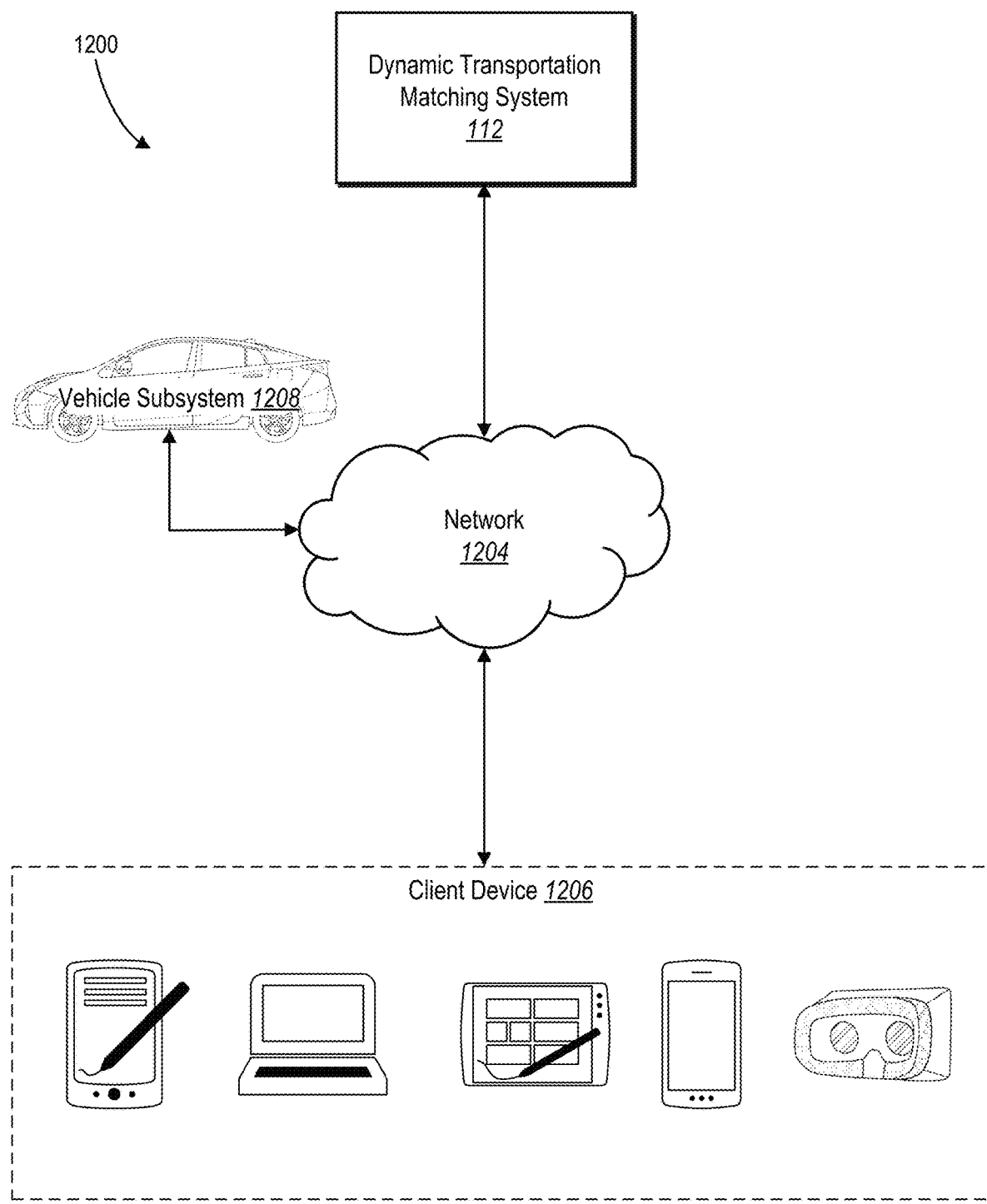
FIG. 12 illustrates an example environment for a dynamic transportation matching system in accordance with one or more embodiments of the present disclosure.

FIG. 12 illustrates an example network environment 1200 of the dynamic transportation matching system 112. The network environment 1200 includes a client device 1206 (e.g., the requestor device 116 or the provider devices 102), the dynamic transportation matching system 112, and a vehicle subsystem 1208 connected to each other by a network 1204. Although FIG. 12 illustrates a particular arrangement of the client device 1206, the dynamic transportation matching system 112, the vehicle subsystem 1208, and the network 1204, this disclosure contemplates any suitable arrangement of client device 1206, the dynamic transportation matching system 112, the vehicle subsystem 1208, and the network 1204. As an example, and not by way of limitation, two or more of client device 1206, the dynamic transportation matching system 112, and the vehicle subsystem 1208 communicate directly, bypassing network 1204. As another example, two or more of client device 1206, the dynamic transportation matching system 112, and the vehicle subsystem 1208 may be physically or logically co-located with each other in whole or in part.

Moreover, although FIG. 12 illustrates a particular number of client devices 1206, dynamic transportation matching system 112, vehicle subsystems 1208, and networks 1204, this disclosure contemplates any suitable number of client devices 1206, dynamic transportation matching system 112, vehicle subsystems 1208, and networks 1204. As an example, and not by way of limitation, network environment 1200 may include multiple client device 1206, dynamic transportation matching system 112, vehicle subsystems 1208, and/or networks 1204.

This disclosure contemplates any suitable network 1204. As an example, and not by way of limitation, one or more portions of network 1204 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1204 may include one or more networks 1204.

Links may connect client device 1206, mode management system 114, and vehicle subsystem 1208 to network 1204 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, the client device 1206 may be an electronic device including hardware, software, or embedded logic components or a combination of two or more such components and capable of carrying out the appropriate functionalities implemented or supported by client device 1206. As an example, and not by way of limitation, a client device 1206 may include any of the computing devices discussed above in relation to FIG. 11. A client device 1206 may enable a network user at the client device 1206 to access network 1204. A client device 1206 may enable its user to communicate with other users at other client devices 1206.

In particular embodiments, the client device 1206 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1206 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1206 one or more Hyper Text Markup Language ("HTML") files responsive to the HTTP request. The client device 1206 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, dynamic transportation matching system 112 may be a network-addressable computing system that can host a transportation matching network. The dynamic transportation matching system 112 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the dynamic transportation matching system 112. In addition, the dynamic transportation matching system 112 may manage identities of service requesters such as users/requesters. In particular, the dynamic transportation matching system 112 may maintain requester data such as driving/riding histories, personal data, or other user data in addition to navigation and/or traffic management services or other location services (e.g., GPS services).

In particular embodiments, the dynamic transportation matching system 112 may manage transportation matching services to connect a user/requester with a vehicle and/or provider. By managing the transportation matching services, the dynamic transportation matching system 112 can manage the distribution and allocation of resources from vehicle systems and user resources such as GPS location and availability indicators, as described herein.

The dynamic transportation matching system 112 may be accessed by the other components of network environment 1200 either directly or via network 1204. In particular embodiments, the dynamic transportation matching system 112 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the dynamic transportation matching system 112 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, or a dynamic transportation matching system 112 to manage, retrieve, modify, add, or delete, the information stored in data store.

In particular embodiments, the dynamic transportation matching system 112 may provide users with the ability to take actions on various types of items or objects, supported by the dynamic transportation matching system 112. As an example, and not by way of limitation, the items and objects may include transportation matching networks to which users of the dynamic transportation matching system 112 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the dynamic transportation matching system 112 or by an external system of a third-party system, which is separate from dynamic transportation matching system 112 and coupled to the dynamic transportation matching system 112 via a network 1204.

In particular embodiments, the dynamic transportation matching system 112 may be capable of linking a variety of entities. As an example, and not by way of limitation, the dynamic transportation matching system 112 may enable users to interact with each other or other entities, or to allow users to interact with these entities through an application programming interfaces ("API") or other communication channels.

In particular embodiments, the dynamic transportation matching system 112 may include a variety of servers, sub-systems, programs, modules, logs, and data stores. In particular embodiments, the dynamic transportation matching system 112 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requester profile) store, connection store, third-party content store, or location store. The dynamic transportation matching system 112 may also include suitable components such as network interfaces, security mechanisms, load balancers, failover servers, management-and-network-operations consoles, other suitable components, or any suitable combination thereof. In particular embodiments, the dynamic transportation matching system 112 may include one or more user-profile stores for storing user profiles for transportation providers and/or transportation requesters. A user profile may include, for example, biographic information, demographic information, behavioral information, social information, or other types of descriptive information, such as interests, affinities, or location.

The web server may include a mail server or other messaging functionality for receiving and routing messages between the dynamic transportation matching system 112 and one or more client devices 1206. An action logger may be used to receive communications from a web server about a user's actions on or off the dynamic transportation matching system 112. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from client device 1206 responsive to a request received from client device 1206. Authorization servers may be used to enforce one or more privacy settings of the users of the dynamic transportation matching system 112. A privacy setting of a user determines how particular information associated with a user can be shared. The authorization server may allow users to opt in to or opt out of having their actions logged by the dynamic transportation matching system 112 or shared with other systems, such as, for example, by setting appropriate privacy settings. Third-party-content-object stores may be used to store content objects received from third parties. Location stores may be used for storing location information received from client devices 1206 associated with users.

In addition, the vehicle subsystem 1208 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1208 can include an autonomous vehicle—i.e., a vehicle that does not require a human operator. In these embodiments, the vehicle subsystem 1208 can perform maneuvers, communicate, and otherwise function without the aid of a human provider, in accordance with available technology.

In particular embodiments, the vehicle subsystem 1208 may include one or more sensors incorporated therein or associated thereto. For example, sensor(s) can be mounted on the top of the vehicle subsystem 1208 or else can be located within the interior of the vehicle subsystem 1208. In certain embodiments, the sensor(s) can be located in multiple areas at once—i.e., split up throughout the vehicle subsystem 1208 so that different components of the sensor(s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1208 may include a communication device capable of communicating with the client device 1206 and/or the mode management system 114. For example, the vehicle subsystem 1208 can include an on-board computing device communicatively linked to the network 1204 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
providing, for display, via a graphical user interface of a requestor device, a transportation option comprising a first pickup location and a first transportation value, wherein the first transportation value is determined, by one or more servers, based on a number of available provider devices;
detecting, utilizing global positioning data of the requestor device, a current location of the requestor device;
in response to determining that the current location of the requestor device is within a geofence corresponding to a multi-pickup-location area and in response to determining that a cumulative number of provider devices for the multi-pickup-location area satisfies a provider device threshold:
determining, by the one or more servers, and according to the provider device threshold, a second pickup location within the multi-pickup-location area and one or more dynamic limitations associated with the second pickup location;
determining a second transportation value for the second pickup location within the multi-pickup-location area based on the first transportation value, the one or more dynamic limitations associated with the second pickup location, and the provider device threshold, wherein the second transportation value is greater than the first transportation value; and
providing, for display via the graphical user interface of the requestor device:
the second transportation value and a selectable mode option for initiating an alternate location transportation mode corresponding to the multi-pickup-location area; and
a dynamic digital map displaying a first route from the current location of the requestor device to the first pickup location;
receiving, from the requestor device, a user interaction with the selectable mode option; and
initiating, by the one or more servers, the alternate location transportation mode by modifying the first pickup location to the second pickup location within the multi-pickup-location area;
providing, for display via the graphical user interface, a modified dynamic digital map displaying a second route from the current location of the requestor device to the second pickup location; and
in response to detecting, utilizing updated global positioning data of the requestor device, an updated current location of the requestor device, updating the modified dynamic digital map to display the updated current location of the requestor device in relation to the second pickup location.

2. The computer-implemented method as recited in claim 1, further comprising providing, for display via the graphical user interface, and together with the transportation option, a second transportation option corresponding to the first pickup location.

3. The computer-implemented method as recited in claim 1, further comprising:
identifying the provider device threshold associated with the second pickup location, wherein the provider device threshold comprises a threshold number of provider devices that may travel to the second pickup location within a period of time; and
providing the selectable mode option based on the provider device threshold.

4. The computer-implemented method as recited in claim 3 further comprising providing the selectable mode option by:
comparing a cumulative number of provider devices associated with the second pickup location over a time period with the provider device threshold; and
determining that the cumulative number of provider devices satisfies the provider device threshold.

5. The computer-implemented method as recited in claim 1, further comprising dispatching a provider device to the second pickup location within the multi-pickup-location area.

6. The computer-implemented method as recited in claim 1, further comprising providing, for display, a map element together with the transportation option corresponding to the first pickup location and the selectable mode option for initiating the alternate location transportation mode, the map element comprising an indicator representative of the first pickup location.

7. The computer-implemented method as recited in claim 6, further comprising providing the second pickup location for display by updating the map element to comprise an indicator representative of the second pickup location.

8. The computer-implemented method as recited in claim 1, wherein the alternate location transportation mode is not available to requestor devices located outside of the geofence corresponding to the multi-pickup-location area.

9. The computer-implemented method as recited in claim 1, further comprising determining the first transportation value by generating a transportation price associated with transportation services from the first pickup location based on the number of available provider devices.

10. The computer-implemented method as recited in claim 9, further comprising:
providing, for display, via a graphical user interface of an additional requestor device, an additional transportation option comprising a pickup location and a transportation value;
in response to determining that that an updated cumulative number of provider devices for the multi-pickup-location area does not satisfy the provider device threshold, withholding the alternate location transportation mode from the additional requestor device.

11. A system comprising:
at least one processor; and
a non-transitory computer readable medium comprising instructions that, when executed by the at least one processor, cause the system to:
provide, for display, via a graphical user interface of a requestor device, a transportation option comprising a first pickup location and a first transportation value, wherein the first transportation value is determined, by one or more servers, based on a number of available provider devices;
detect, utilizing global positioning data of the requestor device, a current location of the requestor device;
in response to determining that the current location of the requestor device is within a geofence corresponding to a multi-pickup-location area and in response to determining that a cumulative number of provider devices for the multi-pickup-location area satisfies a provider device threshold:
determine, by the one or more servers and according to the provider device threshold, a second pickup location within the multi-pickup-location area and one or more dynamic limitations associated with the second pickup location;
determine a second transportation value for the second pickup location within the multi-pickup-location area based on the first transportation value, the one or more dynamic limitations associated with the second pickup location, and the provider device threshold, wherein the second transportation value is greater than the first transportation value; and
provide, for display via the graphical user interface of the requestor device:
the second transportation value and a selectable mode option for initiating an alternate location transportation mode corresponding to the multi-pickup-location area; and
a dynamic digital map displaying a first route from the current location of the requestor device to the first pickup location;
receive, from the requestor device, a user interaction with the selectable mode option;
initiate the alternate location transportation mode by modifying the first pickup location to the second pickup location within the multi-pickup-location area and providing the second pickup location for display via the graphical user interface;
provide, for display via the graphical user interface, a modified dynamic digital map displaying a second route from the current location of the requestor device to the second pickup location; and
in response to detecting, utilizing updated global positioning data of the requestor device, an updated current location of the requestor device, updating the modified dynamic digital map to display the updated current location of the requestor device in relation to the second pickup location.

12. The system as recited in claim 11, further comprising instructions that, when executed by the at least one processor, cause a transportation matching system to provide, for display via the graphical user interface, and together with the transportation option, a second transportation option corresponding to the first pickup location.

13. The system as recited in claim 11, further comprising instructions that, when executed by the at least one processor, cause a transportation matching system to:
identify the provider device threshold associated with the second pickup location,, wherein the provider device threshold comprises a threshold number of provider devices that may travel to the second pickup location within a period of time; and provide the selectable mode option based on the provider device threshold.

14. The system as recited in claim 13, further comprising instructions that, when executed by the at least one processor, cause the transportation matching system to provide the selectable mode option by:
    compare a cumulative number of provider devices associated with the second pickup location over a time period with the provider device threshold; and
    determine that the cumulative number of provider devices satisfies the provider device threshold.

15. The system as recited in claim 11, further comprising instructions that, when executed by the at least one processor, cause a transportation matching system to dispatch a provider device to the second pickup location within the multi-pickup-location area.

16. A non-transitory computer readable medium comprising instructions that, when executed by at least one processor, cause a computing device to:
    provide, for display, via a graphical user interface of a requestor device, a transportation option comprising a first pickup location and a first transportation value, wherein the first transportation value is determined, by one or more servers, based on a number of available provider devices;
    detect, utilizing global positioning data of the requestor device, a current location of the requestor device;
    in response to determining that current location of the requestor device is within a geofence corresponding to a multi-pickup-location area and in response to determining that a cumulative number of provider devices for the multi-pickup-location area satisfies a provider device threshold:
       determine, by the one or more servers and according to the provider device threshold, a second pickup location within the multi-pickup-location area and one or more dynamic limitations associated with the second pickup location;
       determine a second transportation value for the second pickup location within the multi-pickup-location area based on the first transportation value, the one or more dynamic limitations associated with the second pickup location, and the provider device threshold, wherein the second transportation value is greater than the first transportation value; and
    provide, for display via the graphical user interface of the requestor device;
       the second transportation value and a selectable mode option for initiating an alternate location transportation mode corresponding to the multi-pickup-location area; and
       a dynamic digital map displaying a first route from the current location of the requestor device to the first pickup location;
    receive, from the requestor device, a user interaction with the selectable mode option;
    initiate, by the one or more servers, the alternate location transportation mode by modifying the first pickup location to the second pickup location within the multi-pickup-location area and providing the second pickup location for display via the graphical user interface;
    provide, for display via the graphical user interface, a modified dynamic digital map displaying a second route from the current location of the requestor device to the second pickup location; and
    in response to detecting, utilizing updated global positioning data of the requestor device, an updated current location of the requestor device, updating the modified dynamic digital map to display the updated current location of the requestor device in relation to the second pickup location.

17. The non-transitory computer readable medium as recited in claim 16, further comprising instructions that, when executed by the at least one processor, cause the computing device to provide, for display via the graphical user interface, and together with the transportation option, a second transportation option corresponding to the first pickup location.

18. The non-transitory computer readable medium as recited in claim 16, further comprising instructions that, when executed by the at least one processor, cause the computing device to:
    identify the provider device threshold associated with the second pickup location, wherein the provider device threshold comprises a threshold number of provider devices that may travel to the second pickup location within a period of time; and
    provide the selectable mode option based on the provider device threshold.

19. The non-transitory computer readable medium as recited in claim 18, further comprising instructions that, when executed by the at least one processor, cause the computing device to provide the selectable mode option by:
    compare a cumulative number of provider devices associated with the second pickup location over a time period with the provider device threshold; and
    determine that the cumulative number of provider devices satisfies the provider device threshold.

20. The non-transitory computer readable medium as recited in claim 16, further comprising instructions that, when executed by the at least one processor, cause the computing device to dispatch a provider device to the second pickup location within the multi- pickup-location area.

* * * * *